United States Patent
Lu et al.

(10) Patent No.: US 12,262,241 B2
(45) Date of Patent: Mar. 25, 2025

(54) COMMUNICATION METHOD, APPARATUS, AND SYSTEM

(71) Applicant: HUAWEI TECHNOLOGIES CO., LTD., Shenzhen (CN)

(72) Inventors: Wei Lu, Shenzhen (CN); Huan Li, Shenzhen (CN); Hualin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 460 days.

(21) Appl. No.: 17/847,823

(22) Filed: Jun. 23, 2022

(65) Prior Publication Data

US 2022/0330080 A1    Oct. 13, 2022

Related U.S. Application Data

(63) Continuation of application No. PCT/CN2019/128428, filed on Dec. 25, 2019.

(51) Int. Cl.
*H04W 28/02*    (2009.01)
*H04W 28/10*    (2009.01)
*H04W 80/10*    (2009.01)

(52) U.S. Cl.
CPC ...... *H04W 28/0257* (2013.01); *H04W 28/10* (2013.01); *H04W 80/10* (2013.01)

(58) Field of Classification Search
CPC .. H04W 28/0257; H04W 28/10; H04W 80/10
See application file for complete search history.

(56) References Cited

U.S. PATENT DOCUMENTS

| 2018/0279180 | A1* | 9/2018 | Lee ............... H04W 36/0019 |
| 2019/0007500 | A1 | 1/2019 | Kim et al. |
| 2019/0215724 | A1* | 7/2019 | Talebi Fard ......... H04W 48/16 |

OTHER PUBLICATIONS

Huawei et al, "S2-1909765", Clarification of Session-TMBR, Oct. 4, 2019, total 3 pages.
Ericsson, "S2-1909316", PDU session related policy control information, Oct. 4, 2019, total 8 pages.
International Search Report issued in corresponding International Application No. PCT/CN2019/128428, dated Sep. 17, 2020, pp. 1-10.
ZTE, Discussion on Session-AMBR and UE-AMBR for DC. 3GPP TSG-RAN WG3#97, Berlin, Germany, Aug. 21-25, 2017, R3-172690, 4 pages.
Extended European Search Report issued in corresponding European Application No. 19957717.2, dated Sep. 27, 2022, pp. 1-5.

* cited by examiner

*Primary Examiner* — Brian P Cox
(74) *Attorney, Agent, or Firm* — HAUPTMAN HAM, LLP

(57) ABSTRACT

Embodiments of this application provide a communication method, apparatus, and system. The method includes: A first user plane network element controls, based on a first AMBR, one or more data flows that are in data flows of a first session and that are transmitted on a data transmission channel of a first access technology; and a UL CL controls, based on a second AMBR, data flows that are in the data flows of the first session and that are transmitted on data transmission channels of a second access technology. This implements control on the data flows of the session and helps improve communication quality.

20 Claims, 12 Drawing Sheets

COMMUNICATION METHOD, APPARATUS, AND SYSTEM

CROSS-REFERENCE TO RELATED APPLICATIONS

This application is a continuation of International Patent Application No. PCT/CN2019/128428, filed on Dec. 25, 2019, which is hereby incorporated in entirety by reference.

BACKGROUND

In a multi-access protocol data unit (MA-PDU) session scenario, data flows of one MA-PDU session is transmitted on data transmission channels of two different access technologies.

After an uplink classifier (UL CL) for traffic steering is inserted into a data transmission channel of one of the access technologies, because there is no unified aggregation point, between the data transmission channels of the two access technologies, for controlling an aggregate maximum bit rate (AMBR) of downlink data flows, an actual downlink AMBR of the MA-PDU session exceeds an allowed AMBR.

SUMMARY

Embodiments of this application provide a communication method, apparatus, and system, to control downlink data flows of an MA-PDU session.

According to a first aspect, this application provides a communication method. The method includes: determining that a first session is a multi-access protocol data unit MA-PDU session, where data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is a first user plane network element, and an aggregation point of the first data transmission channel and the second data transmission channel is an uplink classifier UL CL; determining a first aggregate maximum bit rate AMBR, and sending the first AMBR to the first user plane network element, where the first AMBR is used by the first user plane network element to control one or more data flows that are in the data flows of the first session and that are transmitted on the data transmission channel of the first access technology; and determining a second AMBR, and sending the second AMBR to the UL CL, where the second AMBR is used by the UL CL to control data flows that are in the data flows of the first session and that are transmitted on the data transmission channels of the second access technology.

Based on the foregoing embodiment, the first user plane network element receives the first AMBR from a session management network element, to control, based on the first AMBR, the one or more data flows that are in the data flows of the first session and that are transmitted on the data transmission channel of the first access technology. The UL CL receives the second AMBR from the session management network element, to control, based on the second AMBR, the data flows that are in the data flows of the first session and that are transmitted on the data transmission channels of the second access technology. This implements control on the data flows of the session and helps improve communication quality.

In a possible implementation method, the determining that a first session is an MA-PDU session includes: receiving first indication information from a mobility management network element, where the first indication information indicates that the first session is the MA-PDU session; or receiving an access traffic steering, switching, and splitting ATSSS rule from a policy control network element, and determining, according to the ATSSS rule, that the first session is the MA-PDU session, where the ATSSS rule includes information about the first access technology and information about the second access technology.

In a possible implementation method, a third AMBR is determined, and the third AMBR is sent to the first user plane network element, where the third AMBR is used by the first user plane network element to control one or more data flows that are in the data flows of the first session and that are transmitted on the first data transmission channel.

In a possible implementation method, a fourth AMBR is determined, and the fourth AMBR is sent to a second user plane network element, where the fourth AMBR is used by the second user plane network element to control one or more data flows that are in the data flows of the first session and that are transmitted on the second data transmission channel, and the one or more data flows that are in the data flows of the first session and that are transmitted on the second data transmission channel pass through the second user plane network element.

In a possible implementation method, the data flows of the first session include a first data flow, and a steering mode of the first data flow is a priority-based mode. Second indication information is sent to the first user plane network element, where the second indication information is used to request a split percentage of the first data flow. The split percentage of the first data flow is received from the first user plane network element.

According to a second aspect, this application provides a communication method. The method includes: A session management network element determines that a first session is a multi-access protocol data unit MA-PDU session, where data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is a first user plane network element, and an aggregation point of the first data transmission channel and the second data transmission channel is an uplink classifier UL CL. The session management network element sends first indication information to the first user plane network element, where the first indication information is used to indicate the first user plane network element to determine a first aggregate maximum bit rate AMBR, and the first AMBR is used by the first user plane network element to control one or more data flows that are in the data flows of the first session and that are transmitted on the data transmission channel of the first access technology. The session management network element sends second indication information to the UL CL, where the second indication information is used to indicate the UL CL to determine a second AMBR, and the second AMBR is used by the UL CL to control data flows that are in the data flows of the first session and that are transmitted on the data transmission channels of the second access technology.

Based on the foregoing embodiment, the first user plane network element determines the first AMBR, to control, based on the first AMBR, the one or more data flows that are in the data flows of the first session and that are transmitted on the data transmission channel of the first access technology. The UL CL determines the second AMBR, to control, based on the second AMBR, the data flows that are in the data flows of the first session and that are transmitted on the data transmission channels of the second access technology. This implements control on the data flows of the session and helps improve communication quality.

In a possible implementation method, that a session management network element determines that a first session is an MA-PDU session includes: The session management network element receives third indication information from a mobility management network element, where the third indication information indicates that the first session is the MA-PDU session; or the session management network element receives an access traffic steering, switching, and splitting ATSSS rule from a policy control network element, and determines, according to the ATSSS rule, that the first session is the MA-PDU session, where the ATSSS rule includes information about the first access technology and information about the second access technology.

In a possible implementation method, the first indication information is further used to indicate the first user plane network element to determine a third AMBR, where the third AMBR is used by the first user plane network element to control one or more data flows that are in the data flows of the first session and that are transmitted on the first data transmission channel. Alternatively, the session management network element sends fourth indication information to the first user plane network element, where the fourth indication information is used to indicate to determine a third AMBR.

In a possible implementation method, the session management network element sends fifth indication information to a second user plane network element, where the fifth indication information is used to indicate the second user plane network element to determine a fourth AMBR, the fourth AMBR is used by the second user plane network element to control one or more data flows that are in the data flows of the first session and that are transmitted on the second data transmission channel, and the one or more data flows that are in the data flows of the first session and that are transmitted on the second data transmission channel pass through the second user plane network element.

According to a third aspect, this application provides a communication method. The method includes: A first user plane network element determines a first aggregate maximum bit rate AMBR of a first session, where the first session is a multi-access protocol data unit MA-PDU session, data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is the first user plane network element, and an aggregation point of the first data transmission channel and the second data transmission channel is an uplink classifier UL CL. The first user plane network element controls, based on the first AMBR, one or more data flows that are in the data flows of the first session and that are transmitted on the data transmission channel of the first access technology.

Based on the foregoing embodiment, the first user plane network element determines the first AMBR, to control, based on the first AMBR, the one or more data flows that are in the data flows of the first session and that are transmitted on the data transmission channel of the first access technology. This implements control on the data flows of the session and helps improve communication quality.

In a possible implementation method, the first user plane network element receives first indication information, where the first indication information is used to indicate the first user plane network element to determine the first AMBR; or the first user plane network element determines that the first session is the MA-PDU session.

In a possible implementation method, that the first user plane network element determines that the first session is a MA-PDU session includes: The first user plane network element receives sixth indication information from a mobility management network element, where the sixth indication information indicates that the first session is the MA-PDU session; or the first user plane network element receives an access traffic steering, switching, and splitting ATSSS rule from a policy control network element, and determines, according to the ATSSS rule, that the first session is the MA-PDU session, where the ATSSS rule includes information about the first access technology and information about the second access technology.

According to a fourth aspect, this application provides a communication method. The method includes: An uplink classifier UL CL determines a second aggregate maximum bit rate AMBR of a first session, where the first session is a multi-access protocol data unit MA-PDU session, data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is a first user plane network element, and an aggregation point of the first data transmission channel and the second data transmission channel is the UL CL. The UL CL controls, based on the second AMBR, data flows that are in the data flows of the first session and that are transmitted on the data transmission channels of the second access technology.

Based on the foregoing embodiment, the UL CL determines the second AMBR, to control, based on the second AMBR, the data flows that are in the data flows of the first session and that are transmitted on the data transmission channels of the second access technology. This implements control on the data flows of the session and helps improve communication quality.

In a possible implementation method, the UL CL receives second indication information, where the second indication information is used to indicate the UL CL to determine the second AMBR.

In a possible implementation method, data flows of the first session that pass through the first data transmission channel include a first data flow, and a split percentage of the first data flow between the data transmission channel of the first access technology and the first data transmission channel is determined by the first user plane network element. The UL CL receives a downlink data packet from the first user plane network element, where the downlink data packet carries the split percentage.

According to a fifth aspect, this application provides a communication method. The method includes: A second user plane network element determines a fourth aggregate maximum bit rate AMBR of a first session, where the first session is a multi-access protocol data unit MA-PDU session, data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is a first user plane network element, an aggregation point of the first data transmission channel and the second data transmission channel is an uplink classifier UL CL, and one or more data flows that are in the data flows of the first session and that are transmitted on the second data transmission channel pass through the second user plane network element. The second user plane network element controls, based on the fourth AMBR, the one or more data flows that are in the data flows of the first session and that are transmitted on the second data transmission channel.

Based on the foregoing embodiment, the second user plane network element determines the fourth AMBR, to control, based on the fourth AMBR, the one or more data flows that are in the data flows of the first session and that are transmitted on the second data transmission channel of the second access technology. This implements control on the data flows of the session and helps improve communication quality.

In a possible implementation method, fifth indication information is received, where the fifth indication information is used to indicate the second user plane network element to determine the fourth AMBR.

Based on the first aspect to the fifth aspect, in any one of the foregoing embodiments, a method for determining the first AMBR is:

The first session includes M data flows, one data flow corresponds to one maximum bit rate MBR, N data flows in the M data flows pass through the data transmission channel of the first access technology, and both M and N are positive integers. One or more maximum bit rates of the one or more data flows that are in the data flows of the first session and that are transmitted on the data transmission channel of the first access technology are determined based on N MBRs corresponding to the N data flows and a split percentage at which each of the N data flows passes through the data transmission channel of the first access technology. Maximum bit rates of the data flows of the first session are determined based on M MBRs corresponding to the M data flows. The first AMBR is determined based on a session-AMBR of the first session, the one or more maximum bit rates of the one or more data flows that are in the data flows of the first session and that are transmitted on the data transmission channel of the first access technology, and the maximum bit rates of the data flows of the first session.

In this embodiment of this application, a sequence of determining the one or more maximum bit rates of the one or more data flows that are in the data flows of the first session and that are transmitted on the data transmission channel of the first access technology and determining the maximum bit rates of the data flows of the first session is not limited.

In a possible implementation method, $$\text{the first } AMBR = \text{session-}AMBR * \frac{\sum_{i=1}^{N} MBR_i^* s_i}{\sum_{j=1}^{M} MBR_j},$$

where
  session-AMBR is the session-AMBR of the first session, an MBR of a j(j=1, 2, ..., M)$^{th}$ data flow in the M data flows is $MBR_j$, an MBR of an i(i=1, 2, ..., N)$^{th}$ data flow in the N data flows is $MBR_i$, and a split percentage at which the i$^{th}$ data flow passes through the data transmission channel of the first access technology is $s_i$.

Based on the first aspect to the fifth aspect, in any one of the foregoing embodiments, a method for determining the second AMBR is:

The first session includes the M data flows, one data flow corresponds to one MBR, L data flows in the M data flows pass through the data transmission channels of the second access technology, and both M and L are positive integers. Maximum bit rates of the data flows that are in the data flows of the first session and that are transmitted on the data transmission channels of the second access technology are determined based on L MBRs corresponding to the L data flows and a split percentage at which each of the L data flows passes through the data transmission channel of the second access technology. The maximum bit rates of the data flows of the first session are determined based on the M MBRs corresponding to the M data flows. The second AMBR is determined based on the session-AMBR of the first session, the maximum bit rates of the data flows that are in the data flows of the first session and that are transmitted on the data transmission channels of the second access technology, and the maximum bit rates of the data flows of the first session.

In this embodiment of this application, a sequence of determining the maximum bit rates of the data flows that are in the data flows of the first session and that are transmitted on the data transmission channels of the second access technology and determining the maximum bit rates of the data flows of the first session is not limited.

In a possible implementation method, $$\text{the second } AMBR = \text{session-}AMBR * \frac{\sum_{k=1}^{L} MBR_k * s_k}{\sum_{j=1}^{M} MBR_j},$$

where
  session-AMBR is the session-AMBR of the first session, the MBR of the j (j=1, 2, ..., M)$^{th}$ data flow in the M data flows is $MBR_j$, an MBR of a k (k=1, 2, ..., L)$^{th}$ data flow in the L data flows is AMBR, and a split percentage at which the k$^{th}$ data flow passes through the data transmission channel of the second access technology is $s_k$.

Based on the first aspect to the fifth aspect, in any one of the foregoing embodiments, a method for determining the third AMBR is:

The first session includes the M data flows, one data flow corresponds to one MBR, Q data flows in the M data flows pass through the first data transmission channel, and both M and Q are positive integers. One or more maximum bit rates of the one or more data flows that are in the data flows of the first session and that are transmitted on the first data transmission channel are determined based on Q MBRs corresponding to the Q data flows and a split percentage at which each of the Q data flows passes through the first data transmission channel. The maximum bit rates of the data flows of the first session are determined based on the M MBRs corresponding to the M data flows. The third AMBR is determined based on the session-AMBR of the first session, the one or more maximum bit rates of the one or more data flows that are in the data flows of the first session and that are transmitted on the first data transmission channel, and the maximum bit rates of the data flows of the first session.

In this embodiment of this application, a sequence of determining the one or more maximum bit rates of the one or more data flows that are in the data flows of the first session and that are transmitted on the first data transmission channel and determining the maximum bit rates of the data flows of the first session is not limited.

In a possible implementation method, $$\text{the third } AMBR = \text{session-}AMBR * \frac{\sum_{t=1}^{Q} MBR_t * s_t}{\sum_{j=1}^{M} MBR_j},$$

where session-AMBR is the session-AMBR of the first session, the MBR of the j (j=1, 2, ..., M)$^{th}$ data flow in the M data flows is MBR$_j$, an MBR of a t (t=1, 2, ..., Q)$^{th}$ data flow in the Q data flows is MBR$_t$, and a split percentage at which the t$^{th}$ data flow passes through the first data transmission channel is s$_t$.

Based on the first aspect to the fifth aspect, in any one of the foregoing embodiments, a method for determining the fourth AMBR is:

The first session includes the M data flows, one data flow corresponds to one MBR, P data flows in the M data flows pass through the second data transmission channel, and both M and P are positive integers. One or more maximum bit rates of the one or more data flows that are in the data flows of the first session and that are transmitted on the second data transmission channel are determined based on P MBRs corresponding to the P data flows. The maximum bit rates of the data flows of the first session are determined based on the M MBRs corresponding to the M data flows. The fourth AMBR is determined based on the session-AMBR of the first session, the one or more maximum bit rates of the one or more data flows that are in the data flows of the first session and that are transmitted on the second data transmission channel, and the maximum bit rates of the data flows of the first session.

In this embodiment of this application, a sequence of determining the one or more maximum bit rates of the one or more data flows that are in the data flows of the first session and that are transmitted on the second data transmission channel and determining the maximum bit rates of the data flows of the first session is not limited.

In a possible implementation method, $$\text{the fourth } AMBR = \text{session-}AMBR * \frac{\sum_{t=1}^{P} MBR_r}{\sum_{j=1}^{M} MBR_j},$$

where session-AMBR is the session-AMBR of the first session, the MBR of the j (j=1, 2, ..., M)$^{th}$ data flow in the M data flows is MBR$_j$, and an MBR of an r (r=1, 2, ..., P) a data flow in the P data flows is MBR.

According to a sixth aspect, this application provides a communication apparatus. The apparatus is a session management network element, or is a chip used in the session management network element. The apparatus has functions of implementing the first aspect, the second aspect, the embodiments of the first aspect, or the embodiments of the second aspect. The functions are implemented by hardware, or is implemented by hardware executing corresponding software. The hardware or the software includes one or more modules corresponding to the foregoing functions.

According to a seventh aspect, this application provides a communication apparatus. The apparatus is a first user plane network element, or is a chip used in the first user plane network element. The apparatus has functions of implementing the third aspect or the embodiments of the third aspect. The functions are implemented by hardware, or is implemented by hardware executing corresponding software. The hardware or the software includes one or more modules corresponding to the foregoing functions.

According to an eighth aspect, this application provides a communication apparatus. The apparatus is a UL CL, or is a chip used in the UL CL. The apparatus has functions of implementing the fourth aspect or the embodiments of the fourth aspect. The functions are implemented by hardware, or is implemented by hardware executing corresponding software. The hardware or the software includes one or more modules corresponding to the foregoing functions.

According to a ninth aspect, this application provides a communication apparatus. The apparatus is a second user plane network element, or is a chip used in the second user plane network element. The apparatus has functions of implementing the fifth aspect or the embodiments of the fifth aspect. The functions are implemented by hardware, or is implemented by hardware executing corresponding software. The hardware or the software includes one or more modules corresponding to the foregoing functions.

According to a tenth aspect, this application provides a communication apparatus. The apparatus includes a processor and a memory. The memory is configured to store computer-executable instructions. When the apparatus runs, the processor executes the computer-executable instructions stored in the memory, to enable the apparatus to perform the methods according to the first aspect to the fifth aspect or the embodiments of the first aspect to the fifth aspect.

According to an eleventh aspect, this application provides a communication apparatus. The apparatus includes units or means configured to perform the steps in the first aspect to the fourth aspect or the embodiments of the first aspect to the fifth aspect.

According to a twelfth aspect, this application provides a communication apparatus. The apparatus includes a processor and an interface circuit. The processor is configured to: communicate with another apparatus through the interface circuit, and perform the methods according to the first aspect to the fifth aspect or the embodiments of the first aspect to the fifth aspect. There are one or more processors.

According to a thirteenth aspect, this application provides a communication apparatus. The apparatus includes a processor. The processor is configured to: be connected to a memory, and invoke a program stored in the memory, to perform the methods according to the first aspect to the fifth aspect or the embodiments of the first aspect to the fifth aspect. The memory is located inside the apparatus, or is located outside the apparatus. In addition, there are one or more processors.

According to a fourteenth aspect, this application further provides a computer-readable storage medium. The computer-readable storage medium stores instructions. When the instructions are run on a computer, a processor is enabled to perform the methods according to the first aspect to the fifth aspect or the embodiments of the first aspect to the fifth aspect.

According to a fifteenth aspect, this application further provides a computer program product. When the computer program product runs on a computer, the computer is enabled to perform the methods according to the first aspect to the fifth aspect or the embodiments of the first aspect to the fifth aspect.

According to a sixteenth aspect, this application further provides a chip system. The system includes a processor. The processor is configured to perform the methods according to the first aspect to the fifth aspect or the embodiments of the first aspect to the fifth aspect.

According to a seventeenth aspect, this application further provides a communication system. The system includes a session management network element, a first user plane network element, and a UL CL. The session management network element is configured to: determine that a first session is a multi-access protocol data unit MA-PDU session, where data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is the first user plane network element, and an aggregation point of the first data transmission channel and the second data transmission channel is the UL CL; determine a first aggregate maximum bit rate AMBR, and send the first AMBR to the first user plane network element, where the first AMBR is used by the first user plane network element to control one or more data flows that are in the data flows of the first session and that are transmitted on the data transmission channel of the first access technology; and determine a second AMBR, and send the second AMBR to the UL CL, where the second AMBR is used by the UL CL to control data flows that are in the data flows of the first session and that are transmitted on the data transmission channels of the second access technology. The first user plane network element is configured to control, based on the first AMBR, the one or more data flows that are in the data flows of the first session and that are transmitted on the data transmission channel of the first access technology. The UL CL is configured to control, based on the second AMBR, the data flows that are in the data flows of the first session and that are transmitted on the data transmission channels of the second access technology.

The session management network element in the communication system is the session management network element in the first aspect.

According to an eighteenth aspect, this application further provides a communication method. The method includes: A session management network element determines that a first session is a multi-access protocol data unit MA-PDU session, where data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is a first user plane network element, and an aggregation point of the first data transmission channel and the second data transmission channel is a UL CL; determines a first aggregate maximum bit rate AMBR, and sends the first AMBR to the first user plane network element, where the first AMBR is used by the first user plane network element to control one or more data flows that are in the data flows of the first session and that are transmitted on the data transmission channel of the first access technology; and determines a second AMBR, and sends the second AMBR to the UL CL, where the second AMBR is used by the UL CL to control data flows that are in the data flows of the first session and that are transmitted on the data transmission channels of the second access technology. The first user plane network element controls, based on the first AMBR, the one or more data flows that are in the data flows of the first session and that are transmitted on the data transmission channel of the first access technology. The UL CL controls, based on the second AMBR, the data flows that are in the data flows of the first session and that are transmitted on the data transmission channels of the second access technology.

The session management network element in the communication method is the session management network element in the first aspect.

According to a nineteenth aspect, this application further provides a communication system. The system includes a session management network element, a first user plane network element, and a UL CL. The session management network element is configured to: determine that a first session is a multi-access protocol data unit MA-PDU session, where data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is the first user plane network element, and an aggregation point of the first data transmission channel and the second data transmission channel is the UL CL; send first indication information to the first user plane network element, where the first indication information is used to indicate the first user plane network element to determine a first aggregate maximum bit rate AMBR, and the first AMBR is used by the first user plane network element to control one or more data flows that are in the data flows of the first session and that are transmitted on the data transmission channel of the first access technology; and send second indication information to the UL CL, where the second indication information is used to indicate the UL CL to determine a second AMBR, and the second AMBR is used by the UL CL to control data flows that are in the data flows of the first session and that are transmitted on the data transmission channels of the second access technology. The first user plane network element is configured to: determine the first AMBR, and control, based on the first AMBR, the one or more data flows that are in the data flows of the first session and that are transmitted on the data transmission channel of the first access technology. The UL CL is configured to: determine the second AMBR, and control, based on the second AMBR, the data flows that are in the data flows of the first session and that are transmitted on the data transmission channels of the second access technology.

The session management network element, the first user plane network element, and the UL CL in the communication system is respectively the session management network element in the second aspect, the first user plane network element in the third aspect, and the UL CL in the fourth aspect.

According to a twentieth aspect, this application further provides a communication method. The method includes: A session management network element determines that a first session is a multi-access protocol data unit MA-PDU session, where data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is a first user plane network element, and an aggregation point of the first data transmission channel and the second data transmission channel is a UL CL; sends first indication information to the first user plane network element, where the first indication information is used to indicate the first user plane network element to determine a first aggregate maximum bit rate AMBR, and the first AMBR is used by the first user plane network element to control one or more data flows that are in the data flows of the first session and that are transmitted on the data transmission channel of the first access technology; and sends second indication information to the UL CL, where the second indication information is used to indicate the UL CL to determine a second AMBR, and the second AMBR is used by the UL CL to control data flows that are in the data flows of the first session and that are transmitted on the data transmission channels of the second access technology. The first user plane network element determines the first AMBR, and controls, based on the first AMBR, the one or more data flows that are in the data flows of the first session and that are transmitted on the data transmission channel of the first access technology. The UL CL determines the second AMBR, and controls, based on the second AMBR, the data flows that are in the data flows of the first session and that are transmitted on the data transmission channels of the second access technology.

The session management network element, the first user plane network element, and the UL CL in the communication method is respectively the session management network element in the second aspect, the first user plane network element in the third aspect, and the UL CL in the fourth aspect.

DESCRIPTION OF EMBODIMENTS

To make objectives, technical solutions, and advantages of embodiments of this application clearer, the following further describes embodiments of this application in detail with reference to the accompanying drawings. An operation method in a method embodiment is further applied to an apparatus embodiment or a system embodiment. In the descriptions of embodiments of this application, unless otherwise stated, "a plurality of" means two or more than two.

Figure 1:
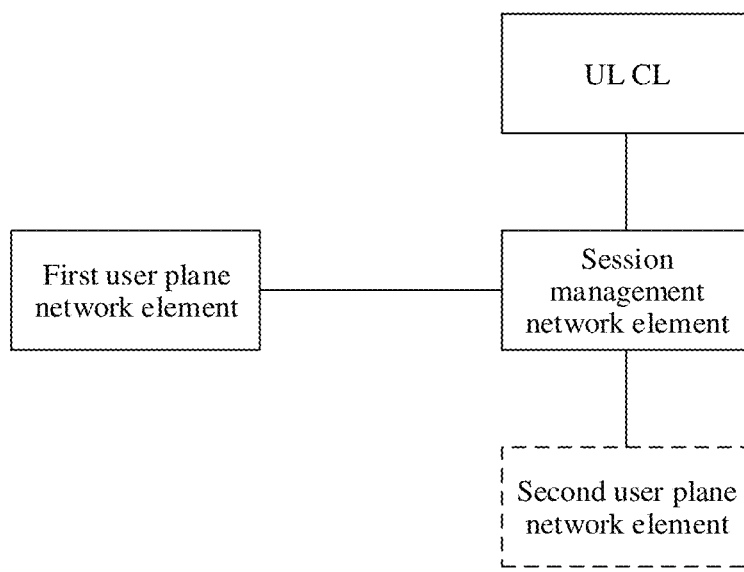
FIG. 1 is a schematic diagram of a communication system according to an embodiment of this application.

To resolve the problem mentioned in the background, FIG. 1 is a schematic diagram of a communication system according to an embodiment of this application. The communication system includes a session management network element, a first user plane network element, and a UL CL. Optionally, the system further includes a second user plane network element.

In the first embodiment:

The session management network element is configured to: determine that a first session is an MA-PDU session, where data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is the first user plane network element, and an aggregation point of the first data transmission channel and the second data transmission channel is the UL CL; determine a first aggregate maximum bit rate AMBR, and send the first AMBR to the first user plane network element, where the first AMBR is used by the first user plane network element to control one or more data flows that are in the data flows of the first session and that are transmitted on the data transmission channel of the first access technology; and determine a second AMBR, and send the second AMBR to the UL CL, where the second AMBR is used by the UL CL to control data flows that are in the data flows of the first session and that are transmitted on the data transmission channels of the second access technology. The first user plane network element is configured to control, based on the first AMBR, the one or more data flows that are in the data flows of the first session and that are transmitted on the data transmission channel of the first access technology. The UL CL is configured to control, based on the second AMBR, the data flows that are in the data flows of the first session and that are transmitted on the data transmission channels of the second access technology.

In a possible implementation method, that the session management network element is configured to determine that a first session is an MA-PDU session includes: The session management network element is configured to: receive first indication information from a mobility management network element, where the first indication information indicates that the first session is the MA-PDU session; or receive an access traffic steering, switching, and splitting ATSSS rule from a policy control network element, and determine, according to the ATSSS rule, that the first session is the MA-PDU session, where the ATSSS rule includes information about the first access technology and information about the second access technology.

In a possible implementation method, the first session includes M data flows, one data flow corresponds to one maximum bit rate MBR, N data flows in the M data flows pass through the data transmission channel of the first access technology, and both M and N are positive integers. That the session management network element is configured to determine a first AMBR includes: The session management network element is configured to: determine, based on N MBRs corresponding to the N data flows and a split percentage at which each of the N data flows passes through the data transmission channel of the first access technology, one or more maximum bit rates of the one or more data flows that are in the data flows of the first session and that are transmitted on the data transmission channel of the first access technology; determine maximum bit rates of the data flows of the first session based on M MBRs corresponding to the M data flows; and determine the first AMBR based on a session-AMBR of the first session, the one or more maximum bit rates of the one or more data flows that are in the data flows of the first session and that are transmitted on the data transmission channel of the first access technology, and the maximum bit rates of the data flows of the first session.

In a possible implementation method, $$\text{the first } AMBR = \text{session-}AMBR * \frac{\sum_{i=1}^{N} MBR_i * s_i}{\sum_{j=1}^{M} MBR_j},$$

where session-AMBR is the session-AMBR of the first session, an MBR of a $j (j=1, 2, \ldots, M)^{th}$ data flow in the M data flows is $MBR_j$, an MBR of an $i (i=1, 2, \ldots, N)^{th}$ data flow in the N data flows is $MBR_i$, and a split percentage at which the $i^{th}$ data flow passes through the data transmission channel of the first access technology is $s_i$.

In a possible implementation method, the first session includes the M data flows, one data flow corresponds to one MBR, L data flows in the M data flows pass through the data transmission channels of the second access technology, and both M and L are positive integers. That the session management network element is configured to determine a second AMBR includes: The session management network element is configured to: determine, based on L MBRs corresponding to the L data flows and a split percentage at which each of the L data flows passes through the data transmission channel of the second access technology, maximum bit rates of the data flows that are in the data flows of the first session and that are transmitted on the data transmission channels of the second access technology; determine the maximum bit rates of the data flows of the first session based on the M MBRs corresponding to the M data flows; and determine the second AMBR based on the session-AMBR of the first session, the maximum bit rates of the data flows that are in the data flows of the first session and that are transmitted on the data transmission channels of the second access technology, and the maximum bit rates of the data flows of the first session.

In a possible implementation method, $$\text{the second } AMBR = \text{session-}AMBR * \frac{\sum_{k=1}^{L} MBR_k * s_k}{\sum_{j=1}^{M} MBR_j},$$

where session-AMBR is the session-AMBR of the first session, the MBR of the j $(j=1, 2, \ldots, M)^{th}$ data flow in the M data flows is $MBR_j$, an MBR of an k $(k=1, 2, \ldots, L)^{th}$ data flow in the L data flows is $MBR_k$, and a split percentage at which the $k^{th}$ data flow passes through the data transmission channel of the second access technology is $s_k$.

In a possible implementation method, the session management network element is further configured to: determine a third AMBR, send the third AMBR to the first user plane network element, where the third AMBR is used by the first user plane network element to control one or more data flows that are in the data flows of the first session and that are transmitted on the first data transmission channel.

In a possible implementation method, the first session includes the M data flows, one data flow corresponds to one MBR, Q data flows in the M data flows pass through the first data transmission channel, and both M and Q are positive integers. That the session management network element is configured to determine a third AMBR includes: The session management network element is configured to: determine, based on Q MBRs corresponding to the Q data flows and a split percentage at which each of the Q data flows passes through the first data transmission channel, one or more maximum bit rates of the one or more data flows that are in the data flows of the first session and that are transmitted on the first data transmission channel; determine the maximum bit rates of the data flows of the first session based on the M MBRs corresponding to the M data flows; and determine the third AMBR based on the session-AMBR of the first session, the one or more maximum bit rates of the one or more data flows that are in the data flows of the first session and that are transmitted on the first data transmission channel, and the maximum bit rates of the data flows of the first session.

In a possible implementation method, $$\text{the third } AMBR = \text{session-}AMBR * \frac{\sum_{t=1}^{Q} MBR_t * s_t}{\sum_{j=1}^{M} MBR_j},$$

Where session-AMBR is the session-AMBR of the first session, the MBR of the j $(j=1, 2 \ldots M)^{th}$ data flow in the M data flows is $MBR_j$, an MBR of a t $(t=1, 2, \ldots, Q)^{th}$ data flow in the Q data flows is $MBR_t$, and a split percentage at which the ta data flow passes through the first data transmission channel is $s_t$.

In a possible implementation method, the first user plane network element is further configured to control, based on the third AMBR, the one or more data flows that are in the data flows of the first session and that are transmitted on the first data transmission channel.

In a possible implementation method, the session management network element is further configured to: determine a fourth AMBR, and send the fourth AMBR to the second user plane network element, where the fourth AMBR is used by the second user plane network element to control one or more data flows that are in the data flows of the first session and that are transmitted on the second data transmission channel, and the one or more data flows that are in the data flows of the first session and that are transmitted on the second data transmission channel pass through the second user plane network element.

In a possible implementation method, the first session includes the M data flows, one data flow corresponds to one MBR, P data flows in the M data flows pass through the second data transmission channel, and both M and P are positive integers. That the session management network element is configured to determine a fourth AMBR includes: The session management network element is configured to: determine, based on P MBRs corresponding to the P data flows, one or more maximum bit rates of the one or more data flows that are in the data flows of the first session and that are transmitted on the second data transmission channel; determine the maximum bit rates of the data flows of the first session based on the M MBRs corresponding to the M data flows; and determine the fourth AMBR based on the session-AMBR of the first session, the one or more maximum bit rates of the one or more data flows that are in the data flows of the first session and that are transmitted on the second data transmission channel, and the maximum bit rates of the data flows of the first session.

In a possible implementation method, $$\text{the fourth } AMBR = \text{session-}AMBR * \frac{\sum_{r=1}^{P} MBR_r}{\sum_{j=1}^{M} MBR_j},$$

where session-AMBR is the session-AMBR of the first session, the MBR of the j (j=1, 2, ..., M)$^{th}$ data flow in the M data flows is MBR$_j$, and an MBR of an r (r=1, 2, ..., P)$^{th}$ data flow in the P data flows is MEK.

In a possible implementation method, the second user plane network element is configured to control, based on the fourth AMBR, the one or more data flows that are in the data flows of the first session and that are transmitted on the second data transmission channel.

In a possible implementation method, the data flows of the first session include a first data flow, and a steering mode of the first data flow is a priority-based mode. The session management network element is further configured to: send second indication information to the first user plane network element, where the second indication information is used to request a split percentage of the first data flow; and receive the split percentage of the first data flow from the first user plane network element.

In the second embodiment:

The session management network element is configured to: determine that a first session is a multi-access protocol data unit MA-PDU session, where data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is the first user plane network element, and an aggregation point of the first data transmission channel and the second data transmission channel is the UL CL; send first indication information to the first user plane network element, where the first indication information is used to indicate the first user plane network element to determine a first aggregate maximum bit rate AMBR, and the first AMBR is used by the first user plane network element to control one or more data flows that are in the data flows of the first session and that are transmitted on the data transmission channel of the first access technology; and send second indication information to the UL CL, where the second indication information is used to indicate the UL CL to determine a second AMBR, and the second AMBR is used by the UL CL to control data flows that are in the data flows of the first session and that are transmitted on the data transmission channels of the second access technology. The first user plane network element is configured to: determine the first AMBR, and control, based on the first AMBR, the one or more data flows that are in the data flows of the first session and that are transmitted on the data transmission channel of the first access technology. The UL CL is configured to: determine the second AMBR, and control, based on the second AMBR, the data flows that are in the data flows of the first session and that are transmitted on the data transmission channels of the second access technology.

In a possible implementation method, that the session management network element is configured to determine that a first session is an MA-PDU session includes: The session management network element is configured to receive third indication information from a mobility management network element, where the third indication information indicates that the first session is the MA-PDU session; or the session management network element is configured to: receive an access traffic steering, switching, and splitting ATSSS rule from a policy control network element, and determine, according to the ATSSS rule, that the first session is the MA-PDU session, where the ATSSS rule includes information about the first access technology and information about the second access technology.

In a possible implementation method, the first indication information is further used to indicate the first user plane network element to determine a third AMBR, where the third AMBR is used by the first user plane network element to control one or more data flows that are in the data flows of the first session and that are transmitted on the first data transmission channel. Alternatively, the session management network element is further configured to send fourth indication information to the first user plane network element, where the fourth indication information is used to indicate to determine a third AMBR.

In a possible implementation method, the first user plane network element is further configured to: determine the third AMBR, and control, based on the third AMBR, the one or more data flows that are in the data flows of the first session and that are transmitted on the first data transmission channel.

In a possible implementation method, the first session includes M data flows, one data flow corresponds to one MBR, Q data flows in the M data flows pass through the first data transmission channel, and both M and Q are positive integers. That the first user plane network element is configured to determine the third AMBR includes: The first user plane network element is configured to: determine, based on Q MBRs corresponding to the Q data flows and a split percentage at which each of the Q data flows passes through the first data transmission channel, one or more maximum bit rates of the one or more data flows that are in the data flows of the first session and that are transmitted on the first data transmission channel; determine maximum bit rates of the data flows of the first session based on M MBRs corresponding to the M data flows; determine the third AMBR based on a session-AMBR of the first session, the one or more maximum bit rates of the one or more data flows that are in the data flows of the first session and that are transmitted on the first data transmission channel, and the maximum bit rates of the data flows of the first session; and control, based on the third AMBR, the one or more data flows that are in the data flows of the first session and that are transmitted on the first data transmission channel.

In a possible implementation method, $$\text{the third } AMBR = \text{session-}AMBR * \frac{\sum_{t=1}^{Q} MBR_t * s_t}{\sum_{j=1}^{M} MBR_j},$$

where session-AMBR is the session-AMBR of the first session, an MBR of a j (j=1, 2, ..., M)$^{th}$ data flow in the M data flows is MBR$_j$, an MBR of a t (t=1, 2, ..., Q)$^{th}$ data flow in the Q data flows is MBR$_t$, and a split percentage at which the t$^{th}$ data flow passes through the first data transmission channel is s$_t$.

In a possible implementation method, the first session includes the M data flows, one data flow corresponds to one maximum bit rate MBR, N data flows in the M data flows pass through the data transmission channel of the first access technology, and both M and N are positive integers. That the first user plane network element is configured to determine the first AMBR includes: The first user plane network element is configured to: determine, based on N MBRs corresponding to the N data flows and a split percentage at which each of the N data flows passes through the data transmission channel of the first access technology, one or more maximum bit rates of the one or more data flows that are in the data flows of the first session and that are transmitted on the data transmission channel of the first access technology; determine the maximum bit rates of the data flows of the first session based on the M MBRs corresponding to the M data flows; and determine the first AMBR based on the session-AMBR of the first session, the one or more maximum bit rates of the one or more data flows that are in the data flows of the first session and that are transmitted on the data transmission channel of the first access technology, and the maximum bit rates of the data flows of the first session.

In a possible implementation method, $$\text{the first } AMBR = \text{session-}AMBR * \frac{\sum_{i=1}^{N} MBR_i * s_i}{\sum_{j=1}^{M} MBR_j},$$

where session-AMBR is the session-AMBR of the first session, the MBR of the j(j=1, 2, ..., M)$^{th}$ data flow in the M data flows is MBR$_j$, an MBR of an i(i=1, 2, ..., N)$^{th}$ data flow in the N data flows is MBR$_i$, and a split percentage at which the i$^{th}$ data flow passes through the data transmission channel of the first access technology is s$_i$.

In a possible implementation method, the first session includes the M data flows, one data flow corresponds to one maximum bit rate MBR, L data flows in the M data flows pass through the data transmission channels of the second access technology, and both M and L are positive integers. That the UL CL is configured to determine the second AMBR includes: The UL CL is configured to: determine, based on L MBRs corresponding to the L data flows and a split percentage at which each of the L data flows passes through the data transmission channel of the second access technology, maximum bit rates of the data flows that are in the data flows of the first session and that are transmitted on the data transmission channels of the second access technology; determine the maximum bit rates of the data flows of the first session based on the M MBRs corresponding to the M data flows; and determine the second AMBR based on the session-AMBR of the first session, the maximum bit rates of the data flows that are in the data flows of the first session and that are transmitted on the data transmission channels of the second access technology, and the maximum bit rates of the data flows of the first session.

In a possible implementation method, $$\text{the second } AMBR = \text{session-}AMBR * \frac{\sum_{k=1}^{L} MBR_k * s_k}{\sum_{j=1}^{M} MBR_j},$$

where session-AMBR is the session-AMBR of the first session, the MBR of the j (j=1, 2, ..., M)$^{th}$ data flow in the M data flows is MBR$_j$, an MBR of a k (k=1, 2, ..., L)$^{th}$ data flow in the L data flows is MBR$_k$, and a split percentage at which the k$^{th}$ data flow passes through the data transmission channel of the second access technology is s$_k$.

In a possible implementation method, the data flows of the first session that pass through the first data transmission channel include a first data flow, and a split percentage of the first data flow between the data transmission channel of the first access technology and the first data transmission channel is determined by the first user plane network element. The UL CL is further configured to receive a downlink data packet from the first user plane network element, where the downlink data packet carries the split percentage.

In a possible implementation method, the session management network element is further configured to send fifth indication information to the second user plane network element, where the fifth indication information is used to indicate the second user plane network element to determine a fourth AMBR, the fourth AMBR is used by the second user plane network element to control one or more data flows that are in the data flows of the first session and that are transmitted on the second data transmission channel, and the one or more data flows that are in the data flows of the first session and that are transmitted on the second data transmission channel pass through the second user plane network element. The second user plane network element is configured to: determine the fourth AMBR, and control, based on the fourth AMBR, the one or more data flows that are in the data flows of the first session and that are transmitted on the second data transmission channel.

In a possible implementation method, the first session includes the M data flows, one data flow corresponds to one maximum bit rate MBR, P data flows in the M data flows pass through the second data transmission channel, and both M and P are positive integers. That the second user plane network element is configured to determine the fourth AMBR includes: The second user plane network element is configured to: determine, based on P MBRs corresponding to the P data flows, one or more maximum bit rates of the one or more data flows that are in the data flows of the first session and that are transmitted on the second data transmission channel; determine the maximum bit rates of the data flows of the first session based on the M MBRs corresponding to the M data flows; and determine the fourth AMBR based on the session-AMBR of the first session, the one or more maximum bit rates of the one or more data flows that are in the data flows of the first session and that are transmitted on the second data transmission channel, and the maximum bit rates of the data flows of the first session.

In a possible implementation method, $$\text{the fourth } AMBR = \text{session-}AMBR * \frac{\sum_{r=1}^{P} MBR_r}{\sum_{j=1}^{M} MBR_j},$$

where session-AMBR is the session-AMBR of the first session, the MBR of the j (j=1, 2, ..., M)$^{th}$ data flow in the M data flows is $MBR_j$, and an MBR of an r (r=1, 2, ..., P)$^{th}$ data flow in the P data flows is $MBR_r$.

Figure 2:
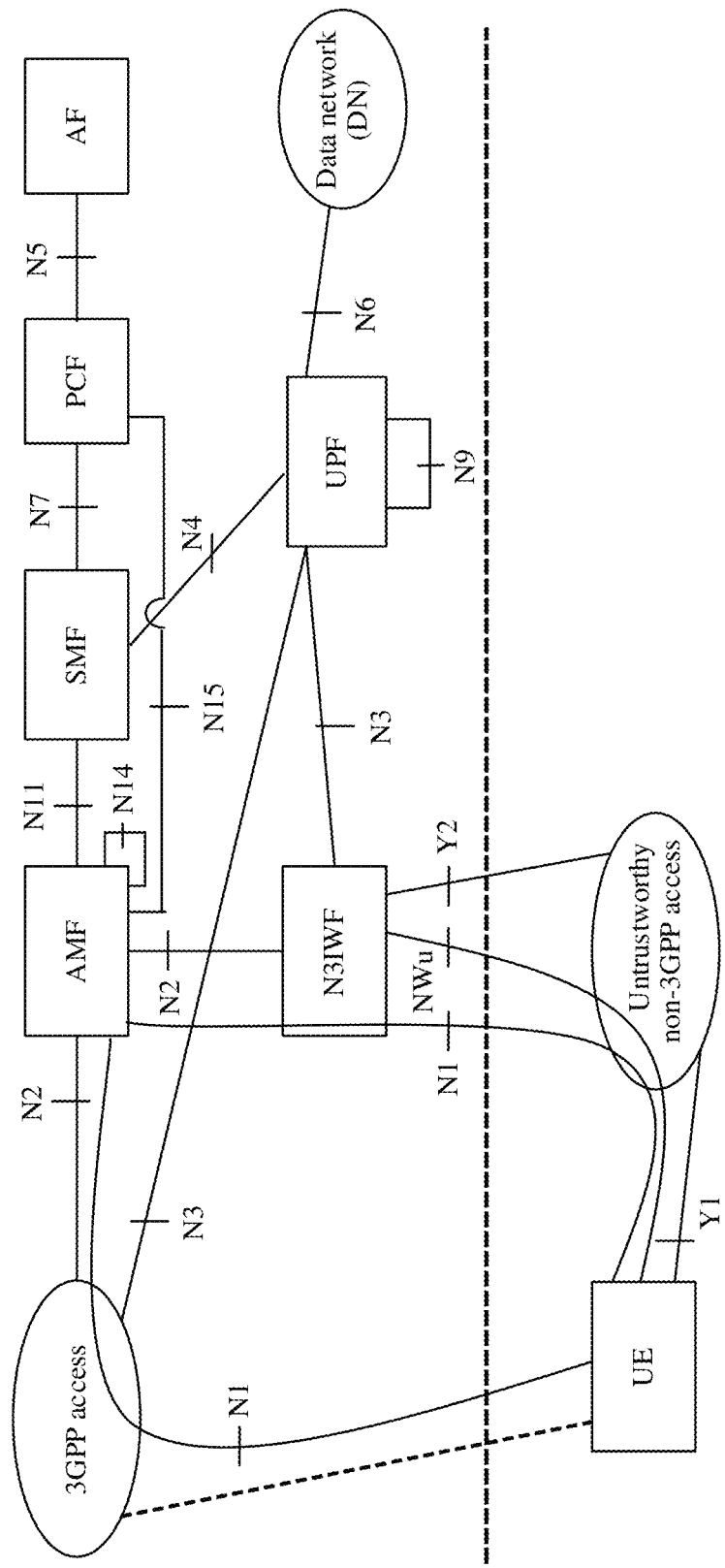
FIG. 2 is a schematic diagram of a 5G network architecture.

FIG. 2 is a schematic diagram of a 5th generation (5G) network architecture. The 5G network architecture shown in FIG. 2 includes three parts: a terminal device, a data network (DN), and a carrier network. The following describes functions of some network elements.

The carrier network includes but is not limited to one or more of the following network elements: a policy control function (PCF) network element, an application function (AF) network element, an access and mobility management function (AMF) network element, a session management function (SMF) network element, an access network and user plane function (UPF) network element, a unified data repository (UDR) (not shown in the figure), and the like. In the foregoing carrier network, parts other than an access network is referred to as core network parts.

The terminal device is a device having a wireless transceiver function. The terminal device is deployed on land, including an indoor or outdoor terminal device, a hand-held terminal device, or a vehicle-mounted terminal device; is deployed on a water surface (for example, on a ship); or is deployed in the air (for example, on an airplane, a balloon, or a satellite). The terminal device is a mobile phone, a tablet (pad), a computer having a wireless transceiver function, a virtual reality (VR) terminal, an augmented reality (AR) terminal, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, user equipment (UE), or the like.

The terminal device establishes a connection to the carrier network through an interface (for example, N1) provided by the carrier network, and use services such as a data service and/or a voice service provided by the carrier network. The terminal device further accesses the data network through the carrier network, and use a carrier service deployed on the data network and/or a service provided by a third party. The third party is a service provider other than the carrier network and the terminal device, and provides services such as a data service and/or a voice service for the terminal device. A representation form of the third party is determined based on an actual application scenario, and is not limited herein.

The access network is a sub-network of the carrier network, and is an implementation system between a service node in the carrier network and the terminal device. To access the carrier network, the terminal device first passes through the access network, and is connected to the service node in the carrier network through the access network. There is two types of access networks: a 3rd generation partnership project (3GPP) access network and a non-3GPP access network. An access device in the 3GPP access network is referred to as a radio access network (RAN) device.

The RAN device is a device that provides a wireless communication function for the terminal device. The RAN device includes but is not limited to a next generation NodeB (gNB) in 5G, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmission reception point (TRP), a transmission point (TP), a mobile switching center, or the like.

The access device in the non-3GPP access network is referred to as a non-3GPP interworking function (N3IWF) device. The N3IWF device includes, for example, a router.

The AMF network element is responsible for access and mobility management, is a termination point of an N2 interface, terminates a non-access stratum (NAS) message, completes registration management, connection management, reachability management, tracking area list (TA list) allocation, mobility management, and the like, and transparently routes a session management message to the SMF.

The SMF network element is responsible for session management, internet protocol (IP) address allocation and management of the UE, allocation and selection of a user plane anchor function, (re)selection of the UPF and a user plane path, and the like.

The UPF network element is responsible for functions such as data packet routing and forwarding, lawful interception, downlink data packet buffering, and downlink data packet notification message triggering.

The AF network element mainly transfers a requirement of an application side on a network side, for example, a quality of service (QoS) requirement or user status event subscription. The AF is a third-party functional entity, or is an application service deployed by a carrier, for example, an IP multimedia subsystem (IMS) voice call service.

The PCF network element is mainly responsible for policy control functions such as session-level or service flow-level charging, QoS bandwidth guarantee and mobility management, and UE policy decision. In this architecture, PCFs connected to the AMF and the SMF respectively correspond to an AM PCF (PCF for access and mobility control) and an SM PCF (PCF for session management). In an actual deployment scenario, the PCFs are unable to be a same PCF entity.

The UDR is mainly responsible for a function of accessing types of data such as subscription data, policy data, and application data.

The DN is a network outside the carrier network. The carrier network accesses a plurality of DNs. A plurality of services are deployed on the DN, and the DN provides services such as a data service and/or a voice service for the terminal device. For example, the DN is a private network of a smart factory, a sensor installed in a workshop of the smart factory is a terminal device, a control server of the sensor is deployed in the DN, and the control server provides a service for the sensor. The sensor communicates with the control server, to obtain instructions of the control server, transmit collected sensor data to the control server according to the instructions, and the like. For another example, the DN is an internal office network of a company, a mobile phone or a computer of an employee of the company is a terminal device, and the mobile phone or the computer of the employee accesses information, data resources, and the like on the internal office network of the company.

The network elements or the functions are network elements in a hardware device, software functions running on dedicated hardware, or virtualized functions instantiated on a platform (for example, a cloud platform). Optionally, the foregoing network elements or functions are implemented by one device, or is jointly implemented by a plurality of devices, or is one functional module in one device. This is not limited in embodiments of this application.

The mobility management network element, the session management network element, the policy control network element, the application function network element, and the user plane network element in embodiments of this application is respectively the AMF, the SMF, the PCF, the UDR, and the UPF in FIG. 2, or is network elements that have functions of the AMF, the SMF, the PCF, the UDR, and the UPF in a future communication network such as a 6th generation (6G) network. This is not limited in embodiments of this application. For ease of description, embodiments of this application are described by using an example in which the mobility management network element, the session management network element, the policy control network element, the data repository, and the user plane network element are respectively the AMF, the SMF, the PCF, the UDR, and the UPF. Further, the terminal device is briefly referred to as UE in embodiments of this application.

To facilitate understanding of the solutions in embodiments of this application, the following first describes related backgrounds.

1. MA-PDU

Figure 3:
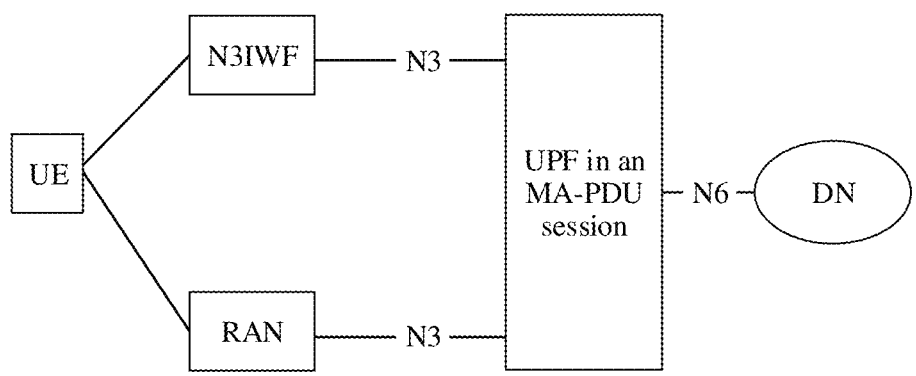
FIG. 3 is a schematic diagram of data transmission.

FIG. 3 is a schematic diagram of data transmission. In a same protocol data unit (PDU) session, there is a 3GPP access network data flow and a non-3GPP access network data flow. A data flow is sent to a DN or a data flow in the DN is received through a same UPF. In an MA-PDU session, there is a tunnel endpoint for data transmission between a UPF in the MA-PDU session and an N3IWF and a tunnel endpoint between the UPF in the MA-PDU session and a RAN. Therefore, from the perspective of the UPF in the MA-PDU session, there are two pieces of tunnel endpoint information respectively corresponding to the N3IWF and the RAN.

2. Steering Mode of a Service Data Flow (SDF)

The steering mode of the service data flow is used to indicate how the service data flow is allocated to data transmission channels of two access technologies. The steering modes of the service data flow include but are not limited to the following.

(1) Active-Standby Mode

An active mode indicates that a service is provided. A standby mode indicates a dormant mode. In the standby mode, data synchronization is performed, and a service is ready to be provided. The two modes are switched over.

In the active-standby mode, when an active access technology is available, the service data flow is transmitted on a data transmission channel of the active access technology. When the active access technology is unavailable, the service data flow is switched to a data transmission channel of a standby access technology. When the active access technology is resumed from an unavailable state to an available state, the service data flow is switched back to the data transmission channel of the active access technology. If the standby access technology is not determined, the service data flow is transmitted in the data transmission channel of the active access technology.

(2) Smallest Delay Mode

In this mode, the service data flow is allocated to a data transmission channel of an access technology with minimum round-trip time (RTT) for transmission. UE and a UPF measures minimum RTT of a 3GPP access technology and minimum RTT of a non-3GPP access technology, and transmit the service data flow in the data transmission channel of the access technology with the minimum RTT. In addition, if one access technology is unavailable, and a policy and charging control (PCC) rule is allowed, service data flows are switched to a data transmission channel of another access technology.

(3) Load-Balancing Mode

In this mode, if two access technologies are available, the service data flow is split to the two access technologies for transmission. The service data flow is transmitted on the data transmission channels of the two access technologies based on a transmission percentage of the data flow.

This mode is applicable to a non-GBR QoS data flow. In addition, if one access technology is unavailable, data flows are switched to a data transmission channel of an available access technology, which means that 100% of the data flow is transmitted on the data transmission channel of the available access technology.

(4) Priority-Based Mode

In this mode, service data flows are directed to a data transmission channel of a high-priority access technology until the access technology is congested. In this case, the service data flows is further transmitted in a data transmission channel of a low-priority access technology. In other words, the service data flows are split to the two access technologies for transmission. In addition, when the high-priority access technology is unavailable, service data flows are switched to the low-priority access technology for transmission.

For the foregoing four steering modes, in the active-standby mode and the smallest delay mode, the service data flow is transmitted on a data transmission channel of one access technology, that is, 100% of the service data flow is transmitted on the data transmission channel of the access technology, and 0% of the service data flow is transmitted on a data transmission channel of another access technology. In the load-balancing mode and the priority-based mode, the service data flow is split to data transmission channels of two access technologies for simultaneous transmission, that is, a percent of the service data flow is transmitted on a data transmission channel of one access technology, and the other percent of the service data flow is transmitted on a data transmission channel of another access technology.

For the load-balancing mode, if the service data flow is split by percentage, a split percentage is delivered by an SMF to the UPF. For the priority-based mode, if the service data flow is split by percentage, a split percentage is determined by the UE and the UPF. In this case, the SMF is unaware of the split percentage of the data flow.

The steering mode of the foregoing data flow is at a data flow granularity. However, one MA-PDU session includes one or more data flows, and steering modes of these data flows are different. Therefore, some data flows are transmitted on a data transmission channel of the 3GPP access technology, and some data flows are transmitted on a data transmission channel of the non-3GPP access technology.

3. QoS Mechanism

Each PDU session is associated with a session-AMBR. The session-AMBR is an aggregate maximum bit rate of each session.

The session-AMBRs include a subscribed session-AMBR and an authorized session-AMBR. The subscribed session-AMBR is a subscription parameter obtained by the SMF from a unified data management (UDM) network element, and the SMF is configured to use the parameter or modify the parameter according to a local policy. The authorized session-AMBR is obtained by authorizing the subscribed session-AMBR by the PCF. The authorized session-AMBR is the same as or different from the subscribed session-AMBR.

The session-AMBR is sent to the UPF and the UE, and is also sent to the RAN, so that the RAN calculates a UE-AMBR. The session-AMBR limits an aggregate bit rate of non-guaranteed bit rate (Non-GBR) QoS flows in a PDU session. That is, the session-AMBR is not used in a guaranteed bit rate (GBR) QoS flow.

Because data flows are classified into an uplink data flow and a downlink data flow, the session-AMBRs further includes an uplink session-AMBR for controlling the uplink data flow and a downlink session-AMBR for controlling the downlink data flow. The UPF controls the uplink data flow based on the uplink session-AMBR and controls the downlink data flow based on the downlink session-AMBR, and the UE controls the uplink data flow based on the uplink session-AMBR.

4. UL CL in a PDU Session

The UL CL is inserted into the PDU session. The UL CL is a UPF device. The UL CL splits a received data flow based on a filter of the data flow received from the SMF.

Figure 4:
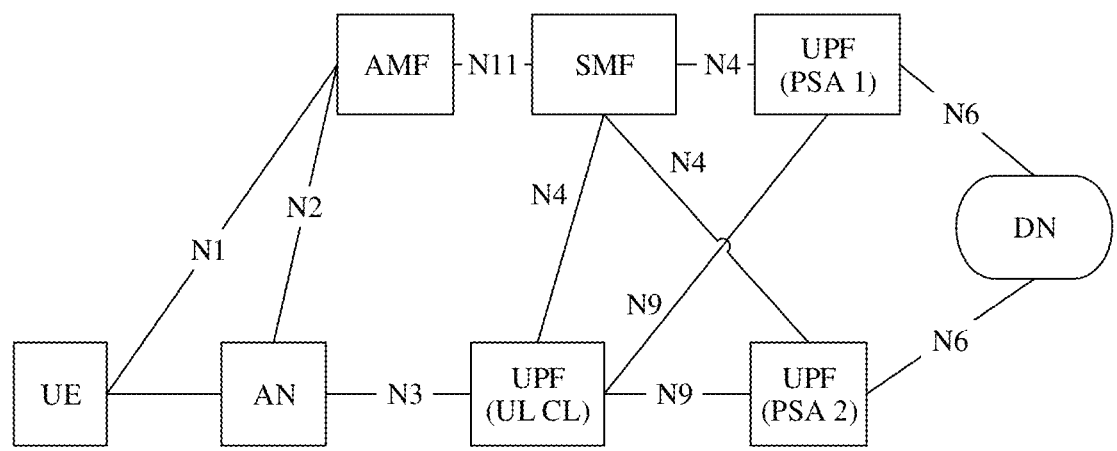
FIG. 4 is a schematic diagram of UL CL-based traffic steering of a PDU session.

FIG. 4 is a schematic diagram of UL CL-based traffic steering of a PDU session. For uplink data flows, after receiving the data flows from an N3 interface, a UPF (UL CL) routes the data flows to two N9 interfaces based on a flow template of a data packet. In this way, the data flows are sent to a same DN through two different UPFs. For downlink data flows, the UL CL aggregates the data flows received from two different UPFs and sends an aggregated data flow to UE through the N3 interface. If the UPF is the last UPF connected to the DN, the UPF is further referred to as a protocol data unit anchor (PSA). As shown in FIG. 4, the UL CL splits a data flow and sends the data flows to a PSA 1 and a PSA 2.

When the PSA 2 is deployed close to the UE, a transmission path of the data flow routed from the UL CL to the PSA 2 is shortened, to shorten a transmission delay.

5. UL CL in an MA-PDU Session

The MA-PDU session includes data transmission channels of two access technologies, and the UL CL is inserted into one or two of the data transmission channels. FIG. 5B is a schematic diagram of UL CL-based traffic steering of an MA-PDU session. In FIG. 5B, the UL CL is inserted into a data transmission channel of a 3GPP access technology. For uplink data flows, after receiving the data flows from an N3 interface, the UL CL routes the data flows to two N9 interfaces based on a flow template of a data packet. In this way, the data flows are sent to a same DN through two different PSAs. For downlink data flows, the UL CL aggregates the data flows received from two different UPFs (where for example, the UPF is a PSA) and sends an aggregated data flow to UE through the N3 interface.

In an MA-PDU session scenario, after the UL CL is inserted into a data transmission channel of one access technology, because the downlink data flows are delivered from both a PSA 1 and a PSA 2 and no unified aggregation point controls an AMBR of the downlink data flows of the MA-PDU session, an actual downlink AMBR of the MA-PDU session exceeds an allowed AMBR.

Figure 5A:
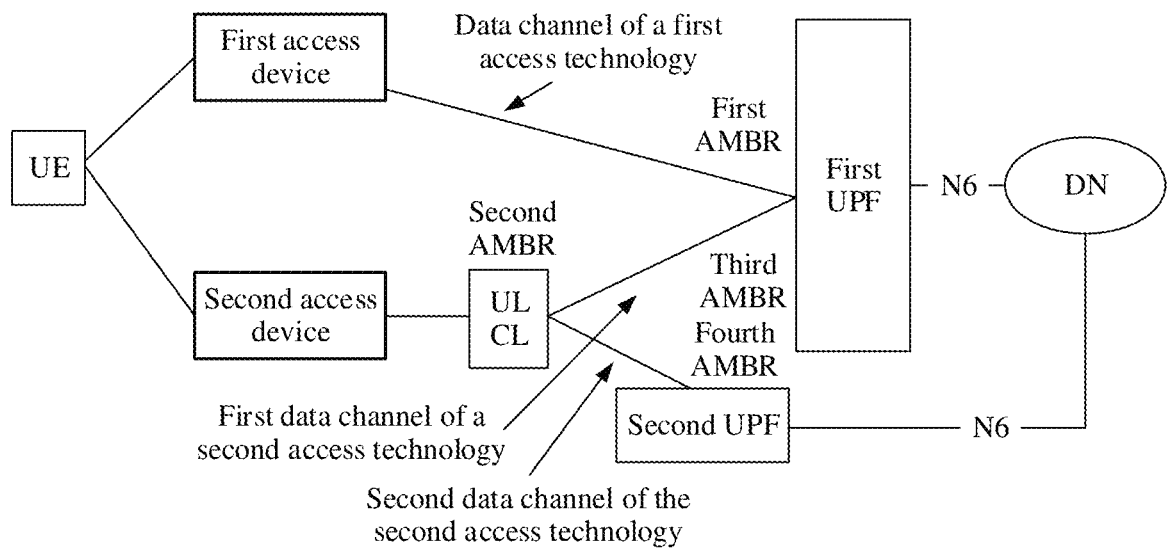
FIG. 5A is a schematic diagram of UL CL-based traffic steering of an MA-PDU session.
Figure 5B:
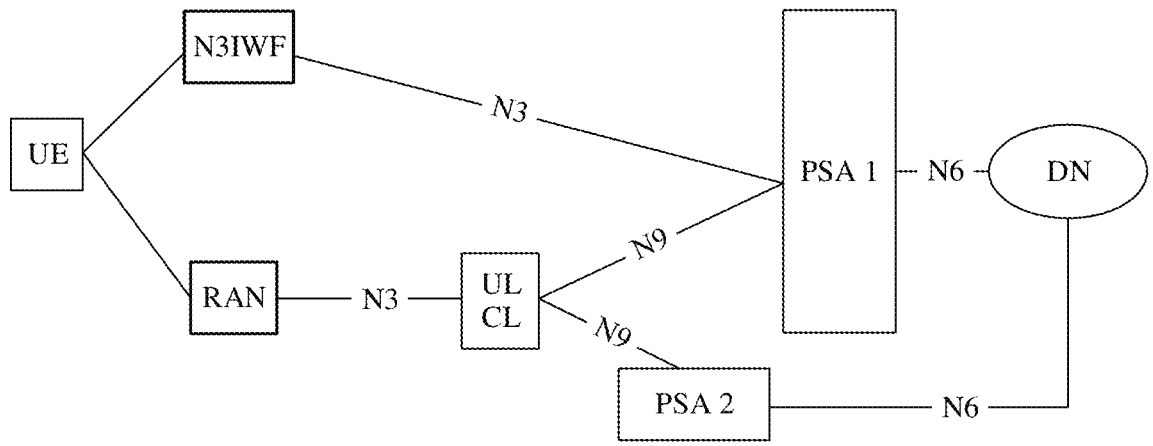
FIG. 5B is another schematic diagram of UL CL-based traffic steering of an MA-PDU session.

FIG. 5A is a schematic diagram of UL CL-based traffic steering of an MA-PDU session. On a user plane, there are the following data transmission channels:

(1) a data channel of a first access technology: UE-first access device-first UPF-DN;
(2) a first data channel of a second access technology: UE-second access device-UL CL-first UPF-DN; and
(3) a second data channel of the second access technology: UE-second access device-UL CL-second UPF-DN.

The first access device is an N3IWF device, the second access device is a RAN device, the first access technology is a non-3GPP access technology, and the second access technology is a 3GPP access technology. Alternatively, the first access device is a RAN device, the second access device is an N3IWF device, the first access technology is a 3GPP access technology, and the second access technology is a non-3GPP access technology.

An aggregation point of the data transmission channel of the first access technology and the first data transmission channel is the first UPF, and an aggregation point of the first data transmission channel and the second data transmission channel is the UL CL. One or more data flows on the second data transmission channel pass through the second UPF. Data flows of a first session are transmitted on the data transmission channel of the first access technology and the data transmission channels of the second access technology. In other words, a data flow of the first session is transmitted on the data channel of the first access technology, transmitted on the first data channel of the second access technology, transmitted on the second data channel of the second access technology, or transmitted on both the data channel of the first access technology and the first data channel of the second access technology.

In embodiments of this application, the data transmission channel of the first access technology is further referred to as a data transmission channel corresponding to the first access technology, the data transmission channel of the second access technology is further referred to as a data transmission channel corresponding to the second access technology, the first data transmission channel of the second access technology is further referred to as a first data transmission channel corresponding to the second access technology, and the second data transmission channel of the second access technology is further referred to as a second data transmission channel corresponding to the second access technology. Unified descriptions are provided herein, and details are not described below again.

Optionally, both the first UPF and the second UPF are PSAs. For example, when the first access device is the N3IWF device, the second access device is the RAN device, the first access technology is the non-3GPP access technology, the second access technology is the 3GPP access technology, the first UPF is a PSA 1, and the second UPF is a PSA 2, the structure shown in FIG. 5A is shown in FIG. 5B. That is, FIG. 5B is an example of FIG. 5A.

When the second UPF is a local UPF, a data flow on the second UPF is referred to as a local data flow, and the local data flow is transmitted on the second data transmission channel.

Figure 6A:
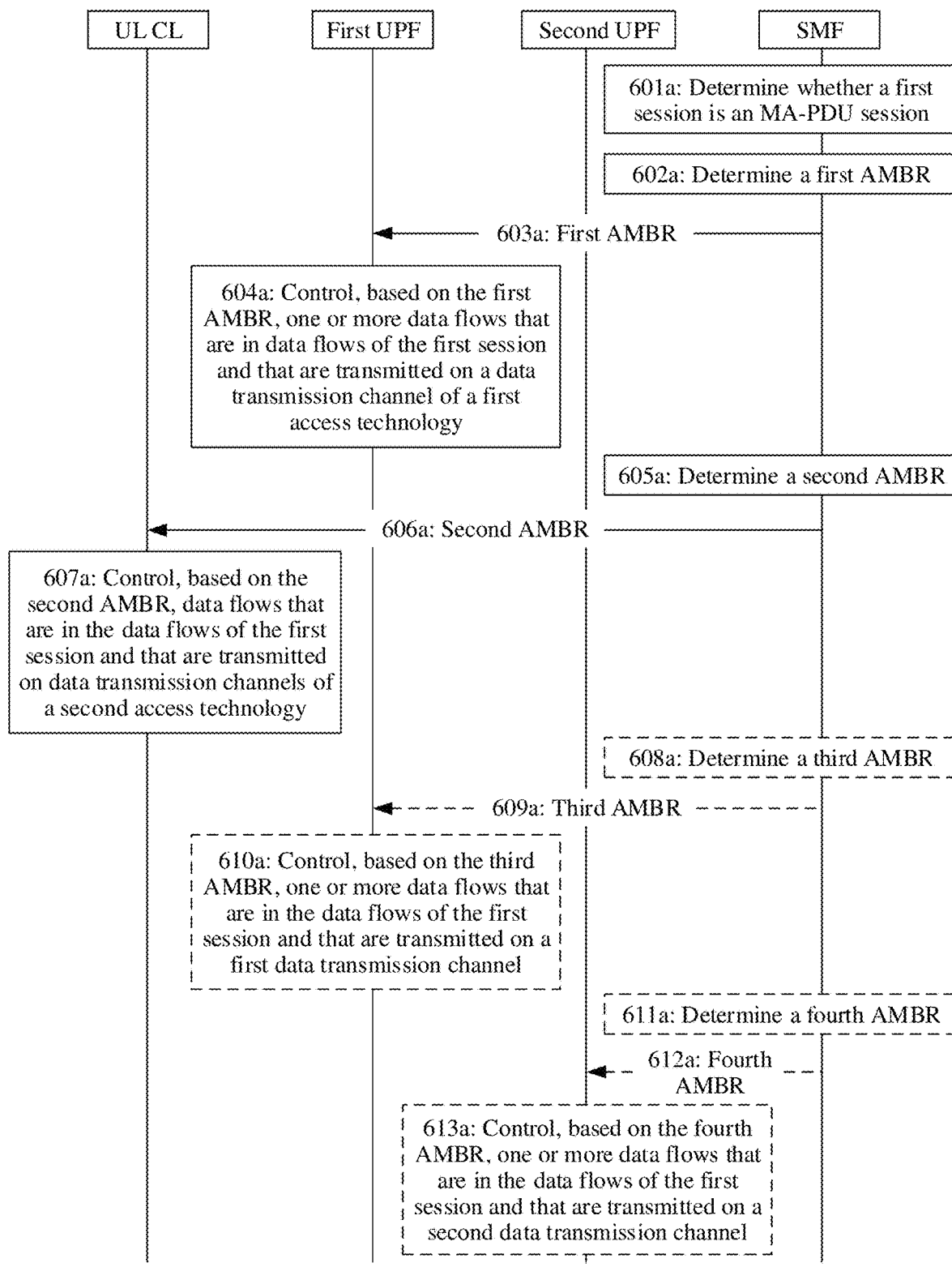
FIG. 6A is a schematic flowchart of a communication method according to an embodiment of this application.

To resolve the foregoing problem, with reference to the network architectures shown in FIG. 2 and FIG. 5A, as shown in FIG. 6A, an embodiment of this application provides a schematic flowchart of a communication method. On a terminal device side, the method is performed by UE or a component (for example, a chip or a circuit) used in the UE. On a network side, the method is performed by a UPF or a component (for example, a chip or a circuit) used in the UPF, or an SMF or a component (for example, a chip or a circuit) used in the SMF. For ease of description, an example in which the method is performed by the UE, the UPF, and the SMF is used below for description. The UPF herein includes a UL CL.

With reference to the structure shown in FIG. 5A, the method shown in FIG. 6A includes the following steps.

Step 601a: The SMF determines that a first session is an MA-PDU session.

Methods in which the SMF determines whether the first session is the MA-PDU session include but are not limited to:

Method 1: The SMF determines, based on first indication information received from an AMF, whether the first session is the MA-PDU session, where the first indication information indicates a type of the first session.

For example, the first indication information indicates that the first session is the MA-PDU session.

Method 2: The SMF determines, according to a received ATSSS rule, whether the first session is the MA-PDU session.

The SMF receives the access traffic steering, switching, and splitting (ATSSS) rule from a PCF, and determines, according to the ATSSS rule, that the first session is the MA-PDU session, where the ATSSS rule includes information about a first access technology and information about a second access technology. For example, when the ATSSS rule includes both the information about the first access technology and the information about the second access technology, the SMF determines that the first session is the MA-PDU session. For another example, when the ATSSS rule includes the information about the first access technology or includes the information about the second access technology, the SMF determines that the first session is not the MA-PDU session.

Step 602a: The SMF determines a first AMBR.

Step 603a: The SMF sends the first AMBR to a first UPF. Accordingly, the first UPF receives the first AMBR.

Step 604a: The first UPF controls, based on the first AMBR, one or more data flows that are in data flows of the first session and that are transmitted on a data transmission channel of the first access technology.

In the foregoing step 602a to step 604a, the first UPF receives the first AMBR from the SMF, to control, based on the first AMBR, the one or more data flows that are in the data flows of the first session and that are transmitted on the data transmission channel of the first access technology. This implements control on the data flows of the session and helps improve communication quality.

Step 605a: The SMF determines a second AMBR.

Step 606a: The SMF sends the second AMBR to the UL CL. Accordingly, the UL CL receives the second AMBR.

Step 607a: The UL CL controls, based on the second AMBR, data flows that are in the data flows of the first session and that are transmitted on data transmission channels of the second access technology.

In the foregoing step 605a to step 607a, the UL CL receives the second AMBR from the SMF, to control, based on the second AMBR, the data flows that are in the data flows of the first session and that are transmitted on the data transmission channels (including a first data channel and a second data channel) of the second access technology. This implements control on the data flows of the session and helps improve the communication quality.

Optionally, the method further includes the following step 608a to step 610a.

Step 608a: The SMF determines a third AMBR.

Step 609a: The SMF sends the third AMBR to the first UPF. Accordingly, the first UPF receives the third AMBR.

Step 610a: The first UPF controls, based on the third AMBR, one or more data flows that are in the data flows of the first session and that are transmitted on the first data transmission channel.

In the foregoing step 608a to step 610a, the first UPF receives the third AMBR from the SMF, to control, based on the third AMBR, the one or more data flows that are in the data flows of the first session and that are transmitted on the first data transmission channel of the second access technology. This implements control on the data flows of the session and helps improve the communication quality.

Optionally, the method further includes the following step 611a to step 613a.

Step 611a: The SMF determines a fourth AMBR.

Step 612a: The SMF sends the fourth AMBR to a second UPF. Accordingly, the second UPF receives the fourth AMBR.

Step 613a: The second UPF controls, based on the fourth AMBR, one or more data flows that are in the data flows of the first session and that are transmitted on the second data transmission channel.

In the foregoing step 611a to step 613a, the second UPF receives the fourth AMBR from the SMF, to control, based on the fourth AMBR, the one or more data flows that are in the data flows of the first session and that are transmitted on the second data transmission channel of the second access technology. This implements control on the data flows of the session and helps improve the communication quality.

In this embodiment of this application, an execution sequence of any one of step 602a to step 604a, any one of step 605a to step 607a, any one of step 608a to step 610a, and any one of step 611a to step 613a is not limited. Alternatively, determining and using the first AMBR, the second AMBR, the third AMBR, and the fourth AMBR are decoupled.

The following describes methods in which the SMF determines the first AMBR, the second AMBR, the third AMBR, and the fourth AMBR.

1. The SMF Determines the First AMBR.

The first session includes M data flows, one data flow corresponds to one maximum bit rate (MBR), N data flows in the M data flows pass through the data transmission channel of the first access technology, and both M and N are positive integers. A process in which the SMF determines the first AMBR includes: The SMF determines, based on N MBRs corresponding to the N data flows and a split percentage at which each of the N data flows passes through the data transmission channel of the first access technology, one or more maximum bit rates of the one or more data flows that are in the data flows of the first session and that are transmitted on the data transmission channel of the first access technology; determines maximum bit rates of the data flows of the first session based on M MBRs corresponding to the M data flows; and determines the first AMBR based on a session-AMBR of the first session, the one or more maximum bit rates of the one or more data flows that are in the data flows of the first session and that are transmitted on the data transmission channel of the first access technology, and the maximum bit rates of the data flows of the first session.

The foregoing process is expressed by using a formula:

$$\text{the first } AMBR = \text{session-}AMBR * \frac{\sum_{i=1}^{N} MBR_i * s_i}{\sum_{j=1}^{M} MBR_j},$$

where session-AMBR is the session-AMBR of the first session, an MBR of a data flow in the M data flows is $MBR_j$, an MBR of an i(i=1, 2, . . . , N)$^{th}$ data flow in the N data flows is $MBR_i$, a split percentage at which the i$^{th}$ data flow passes through the data transmission channel of the first access technology is $s_i$, $\Sigma_{i=1}^{N} MBR_i * s_i$ is a sum of the one or more maximum bit rates of the one or more data flows that are in the data flows of the first session and that are transmitted on the data transmission channel of the first access technology, and $\Sigma_{j=1}^{M} MBR_j$ is a sum of the maximum bit rates of the data flows of the first session.

2. The SMF Determines the Second AMBR.

The first session includes the M data flows, one data flow corresponds to one MBR, L data flows in the M data flows pass through the data transmission channels of the second access technology, and both M and L are positive integers. A process in which the SMF determines the second AMBR includes: The SMF determines, based on L MBRs corresponding to the L data flows and a split percentage at which each of the L data flows passes through the data transmission channel of the second access technology, maximum bit rates of the data flows that are in the data flows of the first session and that are transmitted on the data transmission channels of the second access technology; determines the maximum bit rates of the data flows of the first session based on the M MBRs corresponding to the M data flows; and determines the second AMBR based on the session-AMBR of the first session, the maximum bit rates of the data flows that are in the data flows of the first session and that are transmitted on the data transmission channels of the second access technology, and the maximum bit rates of the data flows of the first session.

The foregoing process is expressed by using a formula:

$$\text{the second } AMBR = \text{session-}AMBR * \frac{\sum_{k=1}^{L} MBR_k * s_k}{\sum_{j=1}^{M} MBR_j},$$

where session-AMBR is the session-AMBR of the first session, the MBR of the j (j=1, 2, . . . , M)$^{th}$ data flow in the M data flows is $MBR_j$, an MBR of a k (k=1, 2, . . . , L)$^{th}$ data flow in the L data flows is $MBR_k$, a split percentage at which the k$^{th}$ data flow passes through the data transmission channel of the second access technology is $s_k$, $\Sigma_{k=1}^{L} MBR_k * s_k$ is a sum of the maximum bit rates of the data flows that are in the data flows of the first session and that are transmitted on the data transmission channels of the second access technology, and $\Sigma_{j=1}^{M} MBR_j$ is the sum of the maximum bit rates of the data flows of the first session.

3. The SMF Determines the Third AMBR.

The first session includes the M data flows, one data flow corresponds to one MBR, Q data flows in the M data flows pass through the first data transmission channel, and both M and Q are positive integers. A process in which the SMF determines the third AMBR includes: The SMF determines, based on Q MBRs corresponding to the Q data flows and a split percentage at which each of the Q data flows passes through the first data transmission channel, one or more maximum bit rates of the one or more data flows that are in the data flows of the first session and that are transmitted on the first data transmission channel; determines the maximum bit rates of the data flows of the first session based on the M MBRs corresponding to the M data flows; and determines the third AMBR based on the session-AMBR of the first session, the one or more maximum bit rates of the one or more data flows that are in the data flows of the first session and that are transmitted on the first data transmission channel, and the maximum bit rates of the data flows of the first session.

The foregoing process is expressed by using a formula:

$$\text{the third } AMBR = \text{session-}AMBR * \frac{\sum_{t=1}^{Q} MBR_t * s_t}{\sum_{j=1}^{M} MBR_j},$$

where session-AMBR is the session-AMBR of the first session, the MBR of the j (j=1, 2 . . . M)$^{th}$ data flow in the M data flows is $MBR_j$, an MBR of a t (t=1, 2, . . . , Q)$^{th}$ data flow in the Q data flows is $MBP_t$, a split percentage at which the t$^{th}$ data flow passes through the first data transmission channel is $s_t$, $\Sigma_{t=1}^{Q} MBR_t * s_t$ is a sum of the one or more maximum bit rates of the one or more data flows that are in the data flows of the first session and that are transmitted on the first data transmission channel, and $\Sigma_{j=1}^{M} MBR_j$ is the sum of the maximum bit rates of the data flows of the first session.

4. The SMF Determines the Fourth AMBR.

The first session includes the M data flows, one data flow corresponds to one MBR, P data flows in the M data flows pass through the second data transmission channel, and both M and P are positive integers. A process in which the SMF determines the fourth AMBR includes: The SMF determines, based on P MBRs corresponding to the P data flows, one or more maximum bit rates of the one or more data flows that are in the data flows of the first session and that are transmitted on the second data transmission channel; determines the maximum bit rates of the data flows of the first session based on the M MBRs corresponding to the M data flows; and determines the fourth AMBR based on the session-AMBR of the first session, the one or more maximum bit rates of the one or more data flows that are in the data flows of the first session and that are transmitted on the second data transmission channel, and the maximum bit rates of the data flows of the first session.

The foregoing process is expressed by using a formula:

$$\text{the fourth } AMBR = \text{session-}AMBR * \frac{\sum_{r=1}^{P} MBR_r}{\sum_{j=1}^{M} MBR_j},$$

where session-AMBR is the session-AMBR of the first session, the MBR of the j (j=1, 2, . . . , M)$^{th}$ data flow in the M data flows is $MBR_j$, an MBR of an r (r=1, 2, . . . , P)$^{th}$ data flow in the P data flows is $MBR_r$, $\Sigma_{r=1}^{P} MBR_r$ is a sum of the one or more maximum bit rates of the one or more data flows that are in the data flows of the first session and that are transmitted on the second data transmission channel, and $\Sigma_{j=1}^{M} MBR_j$ is the sum of the maximum bit rates of the data flows of the first session. The data flow that passes through the second data transmission channel is a local data flow, and the local data flow is not split. In other words, the local data flow passes through the second UPF and the UL CL, but does not pass through the first UPF.

In this embodiment of this application, a steering mode of any data flow of the first session is an active-standby mode, a smallest delay mode, a load-balancing mode, or a priority-based mode.

When the data flows of the first session include a first data flow, and a steering mode of the first data flow is the priority-based mode, the SMF further sends second indication information to the first UPF, where the second indication information is used to request a split percentage of the first data flow, and then the first UPF sends the split percentage of the first data flow to the SMF, so that the SMF receives the split percentage of the first data flow from the first UPF.

Figure 6B:
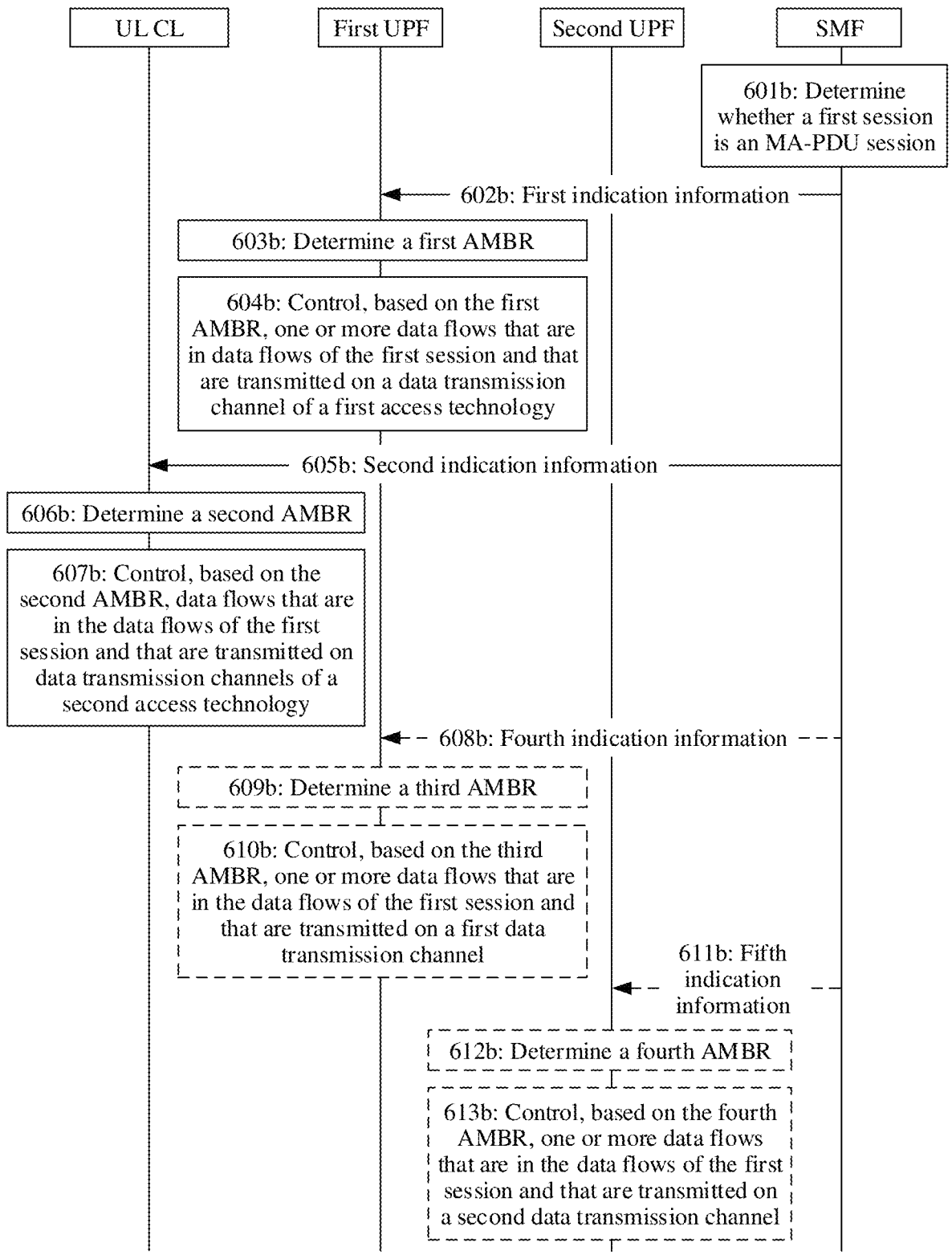
FIG. 6B is a schematic flowchart of another communication method according to an embodiment of this application.

To resolve the foregoing problem, with reference to the network architectures shown in FIG. 2 and FIG. 5A, as shown in FIG. 6B, an embodiment of this application provides a schematic flowchart of a communication method. On a terminal device side, the method is performed by UE or a component (for example, a chip or a circuit) used in the UE. On a network side, the method is performed by a UPF or a component (for example, a chip or a circuit) used in the UPF, or an SMF or a component (for example, a chip or a circuit) used in the SMF. For ease of description, an example in which the method is performed by the UE, the UPF, and the SMF is used below for description. The UPF herein includes a UL CL.

With reference to the structure shown in FIG. 5A, the method shown in FIG. 6B includes the following steps.

Step 601b: The SMF determines that a first session is an MA-PDU session.

Methods in which the SMF determines whether the first session is the MA-PDU session include but are not limited to:

Method 1: The SMF determines, based on third indication information received from an AMF, whether the first session is the MA-PDU session, where the third indication information indicates a type of the first session.

For example, the third indication information indicates that the first session is the MA-PDU session.

Method 2: The SMF determines, based on a received ATSSS rule, whether the first session is the MA-PDU session.

The SMF receives the ATSSS rule from a PCF, and determines, according to the ATSSS rule, that the first session is the MA-PDU session, where the ATSSS rule includes information about a first access technology and information about a second access technology. For example, when the ATSSS rule includes both the information about the first access technology and the information about the second access technology, the SMF determines that the first session is the MA-PDU session. For another example, when the ATSSS rule includes the information about the first access technology or includes the information about the second access technology, the SMF determines that the first session is not the MA-PDU session.

Step 602b: The SMF sends first indication information to a first UPF. Accordingly, the first UPF receives the first indication information.

The first indication information is used to indicate the first UPF to determine a first AMBR.

Step 602b is an optional step. When step 602b is not performed, the first UPF determines that the first session is the MA-PDU session. Methods in which the first UPF determines that the first session is the MA-PDU session include but are not limited to:

Method 1: The first UPF receives sixth indication information from the AMF, where the sixth indication information indicates that the first session is the MA-PDU session.

Method 2: The first UPF receives the ATSSS rule from the PCF, and determines, according to the ATSSS rule, that the first session is the MA-PDU session, where the ATSSS rule includes the information about the first access technology and the information about the second access technology.

Step 603b: The first UPF determines the first AMBR.

Step 604b: The first UPF controls, based on the first AMBR, one or more data flows that are in data flows of the first session and that are transmitted on a data transmission channel of the first access technology.

In the foregoing step 602b to step 604b, the first UPF receives the first indication information from the SMF, to determine the first AMBR based on the first indication information, and control, based on the first AMBR, the one or more data flows that are in the data flows of the first session and that are transmitted on the data transmission channel of the first access technology. This implements control on the data flows of the session and helps improve communication quality.

Step 605b: The SMF sends second indication information to the UL CL. Accordingly, the UL CL receives the second indication information.

The second indication information is used to indicate the UL CL to determine a second AMBR.

Step 606b: The UL CL determines the second AMBR.

Step 607b: The UL CL controls, based on the second AMBR, data flows that are in the data flows of the first session and that are transmitted on data transmission channels of the second access technology.

In the foregoing step 605b to step 607b, the UL CL receives the second indication information from the SMF, to determine the second AMBR based on the second indication information, and control, based on the second AMBR, the data flows that are in the data flows of the first session and that are transmitted on the data transmission channels (including a first data channel and a second data channel) of the second access technology. This implements control on the data flows of the session and helps improve the communication quality.

Optionally, the method further includes the following step 608b to step 610b.

Step 608b: The SMF sends fourth indication information to the first UPF. Accordingly, the first UPF receives the fourth indication information.

The fourth indication information is used to indicate to determine a third AMBR.

Step 608b is an optional step. For example, when step 602b is performed, the first indication information is used to indicate the first UPF to determine the first AMBR, and is used to indicate the first UPF to determine the third AMBR. In this case, step 608b does not need to be performed.

Step 609b: The first UPF determines the third AMBR.

Step 610b: The first UPF controls, based on the third AMBR, one or more data flows that are in the data flows of the first session and that are transmitted on the first data transmission channel.

In the foregoing step 608b to step 610b, the first UPF receives the fourth indication information from the SMF, to determine the third AMBR based on the fourth indication information, and control, based on the third AMBR, the one or more data flows that are in the data flows of the first session and that are transmitted on the first data transmission channel of the second access technology. This implements control on the data flows of the session and helps improve the communication quality.

Optionally, the method further includes the following step 611b to step 613b.

Step 611b: The SMF sends fifth indication information to a second UPF. Accordingly, the second UPF receives the fifth indication information.

Step 612b: The second UPF determines a fourth AMBR.

Step 613b: The second UPF controls, based on the fourth AMBR, one or more data flows that are in the data flows of the first session and that are transmitted on the second data transmission channel.

In the foregoing step 611b to step 613b, the second UPF receives the fifth indication information from the SMF, to determine the fourth AMBR based on the fifth indication information, and control, based on the fourth AMBR, the one or more data flows that are in the data flows of the first session and that are transmitted on the second data transmission channel of the second access technology. This implements control on the data flows of the session and helps improve the communication quality.

In this embodiment of this application, an execution sequence of any one of step 602b to step 604b, any one of step 605b to step 607b, any one of step 608b to step 610b, and any one of step 611b to step 613b is not limited. Alternatively, determining and using the first AMBR, the second AMBR, the third AMBR, and the fourth AMBR are decoupled.

The following describes methods in which the first UPF determines the first AMBR and the third AMBR, the UL CL determines the second AMBR, and the second UPF determines the fourth AMBR.

1. The First UPF Determines the First AMBR and the Third AMBR.

The methods in which the first UPF determines the first AMBR and the third AMBR are similar to the methods in which the SMF determines the first AMBR and the third AMBR in the embodiment corresponding to FIG. 6A. Refer to the foregoing descriptions. Details are not described again.

2. The UL CL Determines the Second AMBR.

The method in which the UL CL determines the second AMBR is similar to the method in which the SMF determines the second AMBR in the embodiment corresponding to FIG. 6A. Refer to the foregoing descriptions. Details are not described again.

When the data flows of the first session that pass through the first data transmission channel include a first data flow, and a split percentage of the first data flow between the data transmission channel of the first access technology and the first data transmission channel is determined by the first UPF, a downlink data packet sent by the first UPF to the UL CL carries the split percentage of the first data flow.

3. The Second UPF Determines the Fourth AMBR.

The method in which the second UPF determines the fourth AMBR is similar to the method in which the SMF determines the fourth AMBR in the embodiment corresponding to FIG. 6A. Refer to the foregoing descriptions. Details are not described again.

In this embodiment of this application, a steering mode of any data flow of the first session is an active-standby mode, a smallest delay mode, a load-balancing mode, or a priority-based mode.

Figure 7A:
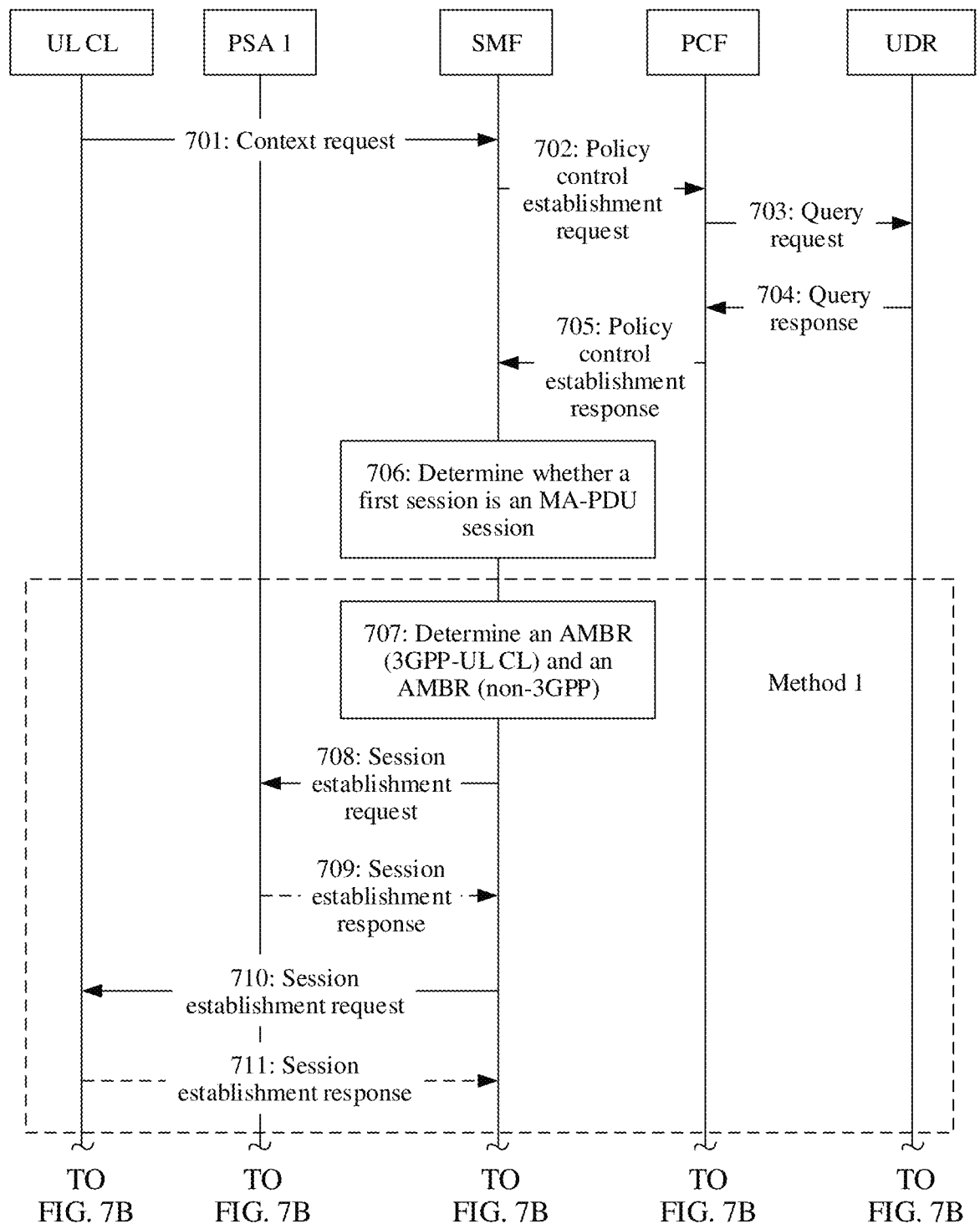
FIG. 7A and FIG. 7B are a schematic flowchart of still another communication method according to an embodiment of this application.
Figure 7B:
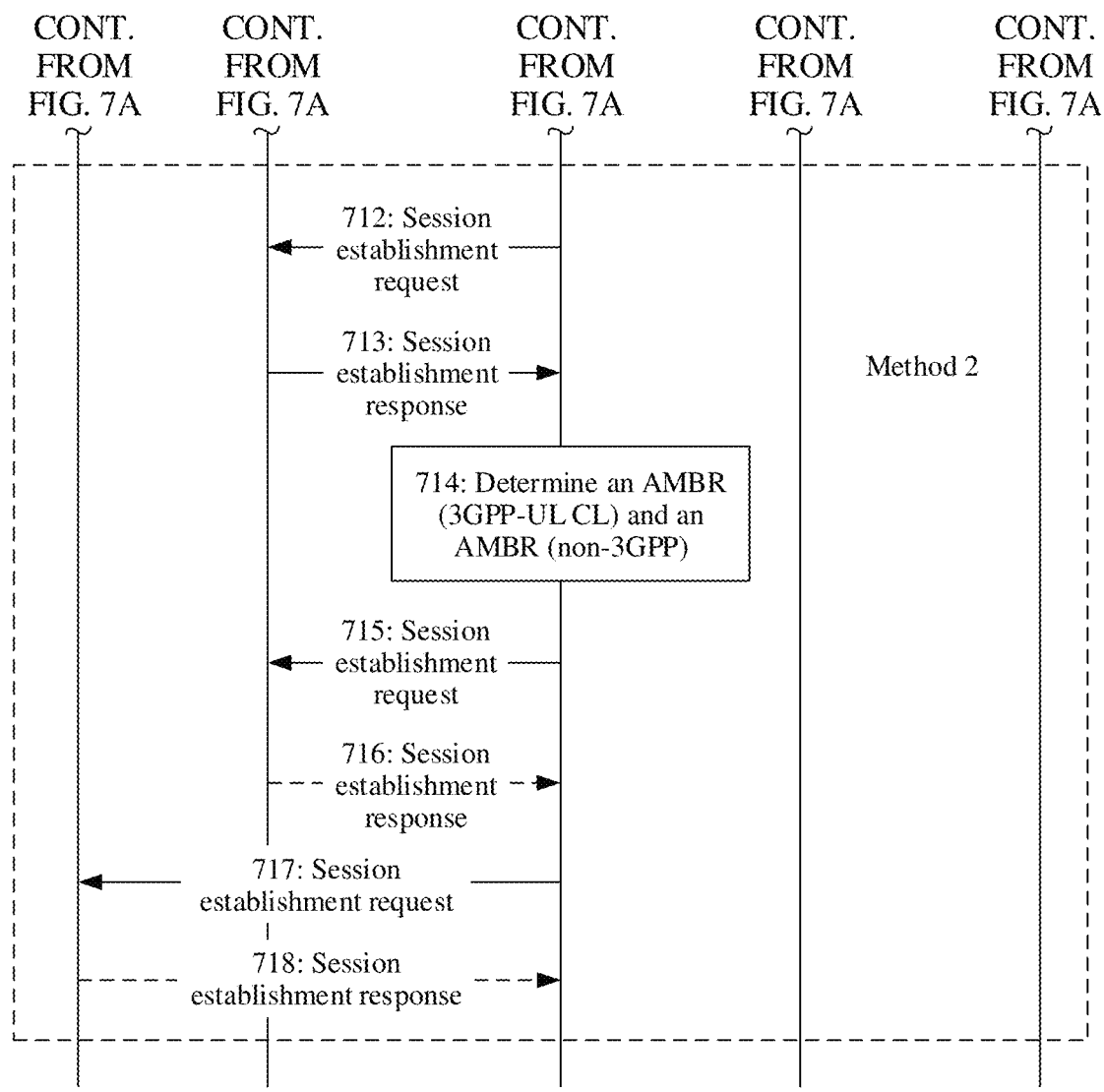

The following describes the processes shown in FIG. 6A with reference to examples. FIG. 7A and FIG. 7B are a schematic flowchart of still another communication method according to an embodiment of this application. The method is an implementation of the embodiment corresponding to FIG. 6A. In the method, an SMF determines AMBRs of data flows that are in data flows of a first session and that are transmitted on data transmission channels of a 3GPP access technology and a non-3GPP access technology.

In an active-standby mode, a smallest delay mode, and a load-balancing mode, the SMF is aware of an identifier, quality of service (including an MBR), and a corresponding steering mode of a data flow in an MA-PDU session. Therefore, the SMF determines the AMBRs on the data transmission channels of the 3GPP access technology and the non-3GPP access technology, and notify a UPF of the AMBRs. Therefore, when an MA-PDU session does not include a data flow in the priority-based mode, that is, the MA-PDU session includes data flows in any one or more of the active-standby mode, the smallest delay mode, and the load-balancing mode, the following step 701 to step 706 and step 707 to step 711 are performed.

In the priority-based mode, the SMF is unaware of a split percentage of a data flow between the data transmission channels of the two access technologies. Therefore, the UPF needs to report the split percentage of the data flow, so that the SMF determines session-AMBRs on the data transmission channels of the two access technologies. Therefore, when an MA-PDU session includes at least a data flow in the priority-based mode, and optionally, the MA-PDU session further includes data flows in any one or more of the active-standby mode, the smallest delay mode, and the load-balancing mode, the following step 701 to step 706 and step 712 to step 716 are performed.

FIG. 5B is used as an example for description in this embodiment, that is, a UL CL is inserted into the data transmission channels of the 3GPP access technology. An implementation method for inserting the UL CL into the data transmission channel of the non-3GPP access technology is similar to an implementation method for inserting the UL CL into the data transmission channels of the 3GPP access technology, and details are not described again.

The embodiment corresponding to FIG. 7A and FIG. 7B is described by using a PDU session (the PDU session is also referred to as the first session) establishment process as an example. In actual application, the method in this embodiment of this application alternatively is performed in a PSA changing process of a multi-PDU session in a session and service continuity (SSC) mode 3.

A PSA 2 in this embodiment is a local UPF, and a data flow passing through the PSA 2 is a local data flow and is not split to a PSA 1. Alternatively, the local data flow passes through the UL CL and the PSA 2, and does not pass through the PSA 1.

In this embodiment, the first AMBR in the embodiment corresponding to FIG. 6A is also referred to as an AMBR (non-3GPP), the second AMBR is also referred to as an AMBR (3GPP-UL CL), the third AMBR is also referred to as an AMBR (3GPP-PSA 1), and the fourth AMBR is also referred to as an AMBR (3GPP-PSA 2).

In this embodiment, the maximum bit rate of the data flow that is in the data flows of the first session and that is transmitted on the data transmission channel of the first access technology in the embodiment corresponding to FIG. 6A is also referred to as a maximum bit rate of the data flow that is in the data flows of the first session and that is transmitted on the data transmission channel of the non-3GPP access technology, the maximum bit rate of the data flow that is in the data flows of the first session and that is transmitted on the data transmission channel of the second access technology is also referred to as a maximum bit rate of the data flow that is in the data flows of the first session and that is transmitted on the data transmission channel of the 3GPP access technology, the maximum bit rate of the data flow that is in the data flows of the first session and that is transmitted on the first data transmission channel is also referred to as a maximum bit rate of a data flow that is in the data flows of the first session and that is transmitted on a first data transmission channel of the 3GPP access technology, and the maximum bit rate of the data flow that is in the data flows of the first session and that is transmitted on the second data transmission channel is also referred to as a maximum bit rate of a data flow that is in the data flows of the first session and that is transmitted on a second data transmission channel of the 3GPP access technology.

The method includes the following steps.

Step 701: The UL CL sends a context request to the SMF. Accordingly, the SMF receives the context request.

For example, the context request is an Nsmf_PDUSession_CreateSMContext request.

Step 702: The SMF sends a policy control establishment request to a PCF. Accordingly, the PCF receives the policy control establishment request.

If the SMF determines that PCC authorization is a condition and requests to establish a session management policy association with the PCF, the SMF sends the policy control establishment request to the PCF. For example, the policy control establishment request is an Npcf_SMPolicyControl_Create request.

Step 703: The PCF sends a query request to a UDR. Accordingly, the UDR receives the query request.

The query request is used to request to query subscription information of UE. For example, the query request is an Nudr_DM_Query & Nudr_DM_Subscribe request.

Step 704: The UDR sends a query response to the PCF. Accordingly, the PCF receives the query response.

The query response includes the subscription information of the UE. The subscription information of the UE includes information related to the first session, for example, a subscribed session-AMBR and an MBR of each data flow of the first session.

For example, the query response is an Nudr_DM_Query & Nudr_DM_Subscribe response.

Step 705: The PCF sends a policy control establishment response to the SMF. Accordingly, the SMF receives the policy control establishment response.

The policy control establishment response includes a PCC rule. The PCC rule includes a rule of the data flow of the first session and a session-AMBR. The session-AMBR is the subscribed session-AMBR or a session-AMBR authorized by the PCF.

Optionally, the PCC rule further includes an access traffic ATSSS rule. The ATSSS rule includes information about access technologies of the data transmission channels of the first session. For example, if the ATSSS rule includes information about the 3GPP access technology and information about the non-3GPP access technology, that indicates the data transmission channels of the first session include the data transmission channels of the 3GPP access technology and the data transmission channel of the non-3GPP access technology.

For example, the policy control establishment response is an Npcf_SMPolicyControl_Create response.

Step 706: The SMF determines whether the first session is the MA-PDU session.

Methods in which the SMF determines whether the first session is the MA-PDU session include but are not limited to:

Method 1: The SMF determines, based on indication information received from an AMF, whether the first session is the MA-PDU session, where the indication information indicates a type of the first session.

For example, the indication information indicates that the first session is the MA-PDU session, or indicates that the first session is not the MA-PDU session.

Method 2: The SMF determines, based on the received ATSSS rule, whether the first session is the MA-PDU session.

If the ATSSS rule is carried in step 705, the SMF determines, according to the ATSSS rule, that the first session is the MA-PDU session, or the first session is not the MA-PDU session.

For example, when the ATSSS rule includes the information about the 3GPP access technology and the information about the non-3GPP access technology, the SMF determines that the first session is the MA-PDU session. For another example, when the ATSSS rule includes the information about the 3GPP access technology or includes the information about the non-3GPP access technology, the SMF determines that the first session is not the MA-PDU session.

If the SMF determines that the first session is the MA-PDU session in step 706, and the MA-PDU session does not include the data flow in the priority-based mode, the following step 707 to step 711 are performed.

Step 707: The SMF determines the AMBR (3GPP-UL CL) and the AMBR (non-3GPP).

The AMBR (3GPP-UL CL) is an AMBR of data flows that are in the data flows of the first session and that are transmitted on the data transmission channels of the 3GPP access technology. The AMBR (3GPP-UL CL) is sent to the UL CL, and the UL CL controls the data flows of the MA-PDU session on the data transmission channels of the 3GPP access technology based on the AMBR (3GPP-UL CL), that is, control a sum of maximum bit rates of the data flows on the data transmission channels of the 3GPP access technology not to exceed the AMBR (3GPP-UL CL).

The AMBR (non-3GPP) is an AMBR of one or more data flows that are in the data flows of the first session and that are transmitted on the data transmission channel of the non-3GPP access technology. The AMBR (non-3GPP) is sent to the PSA 1, and the PSA 1 controls the one or more data flows of the MA-PDU session on the data transmission channel of the non-3GPP access technology based on the AMBR (non-3GPP), that is, control a sum of one or more maximum bit rates of the one or more data flows on the data transmission channel of the non-3GPP access technology not to exceed the AMBR (non-3GPP).

Optionally, the SMF further determines the AMBR (3GPP-PSA 1). The AMBR (3GPP-PSA 1) is an AMBR of the first data transmission channel of the 3GPP access technology. The AMBR (3GPP-PSA 1) is sent to the PSA 1, and the PSA 1 controls the one or more data flows of the MA-PDU session on the data transmission channel of the 3GPP access technology based on the AMBR (3GPP-PSA 1), that is, control a sum of one or more maximum bit rates of the one or more data flows on the data transmission channel of the 3GPP access technology not to exceed the AMBR (3GPP-PSA 1).

Optionally, the SMF further determines the AMBR (3GPP-PSA 2). The AMBR (3GPP-PSA 2) is an AMBR of the second data transmission channel of the 3GPP access technology. The AMBR (3GPP-PSA 2) is sent to the PSA 2, and the PSA 2 controls the one or more data flows of the MA-PDU session on the data transmission channel of the 3GPP access technology based on the AMBR (3GPP-PSA 2), that is, control a sum of one or more maximum bit rates of the one or more data flows on the data transmission channel of the 3GPP access technology not to exceed the AMBR (3GPP-PSA 2).

The following provides descriptions with reference to an example.

For example, the PCC rule received by the SMF from the PCF includes rules of three data flows of an MA-PDU session, and the rules are respectively as follows:

A rule of a data flow 1 is as follows: a flow descriptor: "a user datagram protocol (UDP) with a destination address of 1.2.3.4"; and a steering mode: active-standby, where active=3GPP, and standby=non-3GPP.

A meaning of the rule of the data flow 1 is as follows: For a data flow of the UDP with the destination address of 1.2.3.4, if the data transmission channel of the 3GPP access technology (Active) is available, the data flow is transmitted on the data transmission channel of the 3GPP access technology. If the data transmission channel of the 3GPP access technology (Active) is unavailable, the data flow is transmitted on the data transmission channel of the non-3GPP access technology (Standby).

For ease of description, the data transmission channel of the 3GPP access technology (Active) being unavailable is assumed. Therefore, the flow 1 is transmitted on the data transmission channel of the 3GPP access technology.

The PSA 2 is a local UPF. If the flow 1 is a local data flow, a user plane transmission path of the flow 1 is UE-RAN-UL CL-PSA 2-DN, and the flow 1 does not pass through the PSA 1. In other words, the user plane transmission path of the flow 1 is neither UE-RAN-UL CL-PSA 1-DN nor UE-N3IWF-PSA 1-DN.

A rule of a data flow 2 is as follows:
a flow descriptor: "a transmission control protocol (TCP) with a target port of 8080"; and
a steering mode: smallest delay.

A meaning of the rule of the data flow 2 is as follows: If a data transmission channel in the smallest delay mode is the data transmission channel of the non-3GPP access technology, a data flow of the TCP with the target port of 8080 is transmitted on the data transmission channel of the non-3GPP access technology. If a data transmission channel in the smallest delay mode is the data transmission channel of the 3GPP access technology, a data flow of the TCP with the target port of 8080 is transmitted on the data transmission channel of the 3GPP access technology.

For ease of description, the flow 2 is transmitted on the data transmission channel of the non-3GPP access technology is assumed.

A rule of a data flow 3 is as follows:
a flow descriptor: "Application-1"; and
a steering mode: load-balancing, where 3GPP=20%, and non-3GPP=80%.

A meaning of the rule of the data flow 3 is as follows: A data flow of the application-1 is separately transmitted on the data transmission channel of the 3GPP access technology and the non-3GPP access technology, 20% of the data flow is transmitted on the data transmission channel of the 3GPP access technology, and 80% of the data flow is transmitted on the data transmission channel of the non-3GPP access technology.

In addition, MBRs corresponding to the flow 1, the flow 2, and the flow 3 are respectively an MBR 1, an MBR 2, and an MBR 3 is assumed.

Based on the foregoing example, user plane paths of the flow 1, the flow 2, and the flow 3 are respectively as follows:
the flow 1: UE-RAN-UL CL-PSA 2-DN;
the flow 2: UE-N3IWF-PSA 1-DN;
the flow 3: 20%: UE-RAN-UL CL-PSA 1-DN; and
80%: UE-N3IWF-PSA 1-DN.

Based on the foregoing example, the following information is obtained:

A sum of maximum bit rates of the data flows that are in the data flows of the first session and that are transmitted on the data transmission channels of the 3GPP access technology=MBR 1+MBR 3\*0.2.

A maximum bit rate of the data flow that is in the data flows of the first session and that is transmitted on the first data transmission channel of the 3GPP access technology=MBR 3\*0.2.

A maximum bit rate of the data flow that is in the data flows of the first session and that is transmitted on the second data transmission channel of the 3GPP access technology=MBR 1.

A sum of maximum bit rates of the data flows that are in the data flows of the first session and that are transmitted on the data transmission channel of the non-3GPP access technology=MBR 2+MBR 3\*0.8.

Therefore, AMBR (3GPP-UL CL)=session-AMBR\*(MBR 1+MBR 3\*0.2)/(MBR 1+MBR 2+MBR 3).

AMBR (3GPP-PSA 1)=session-AMBR\*(MBR 3\*0.2)/(MBR 1+MBR 2+MBR 3).

AMBR (3GPP-PSA 2)=session-AMBR\*MBR 1/(MBR 1+MBR 2+MBR 3).

AMBR (non-3GPP)=session-AMBR\*(MBR 2+MBR 3\*0.8)/(MBR 1+MBR 2+MBR 3).

Step 708: The SMF sends a session establishment request to the PSA 1. Accordingly, the PSA 1 receives the session establishment request.

For example, the session establishment request is an N4 session establishment request.

The session establishment request includes the AMBR (non-3GPP). The PSA 1 controls the data flows of the MA-PDU session on the data transmission channel of the non-3GPP access technology based on the AMBR (non-3GPP), that is, control the sum of the maximum bit rates of the data flows (e.g., the flow 2 and the flow 3) on the data transmission channel of the non-3GPP access technology not to exceed the AMBR (non-3GPP).

Optionally, the session establishment request further includes the AMBR (3GPP-PSA 1). The PSA 1 controls the data flow of the MA-PDU session on the data transmission channel of the 3GPP access technology based on the AMBR (3GPP-PSA 1), that is, control the maximum bit rate of the data flow (e.g., the flow 3) on the data transmission channel of the 3GPP access technology not to exceed the AMBR (3GPP-PSA 1).

Step 709: The PSA 1 sends a session establishment response to the SMF. Accordingly, the SMF receives the session establishment response.

For example, the session establishment response is an N4 session establishment response.

Step 709 is an optional step.

Step 710: The SMF sends the session establishment request to the UL CL. Accordingly, the UL CL receives the session establishment request.

For example, the session establishment request is the N4 session establishment request.

The session establishment request includes the AMBR (3GPP-UL CL). The UL CL controls the data flows of the MA-PDU session on the data transmission channels of the 3GPP access technology based on the AMBR (3GPP-UL CL), that is, control the sum of the maximum bit rates of the data flows (e.g., the flow 1 and the flow 3) on the data transmission channels of the 3GPP access technology not to exceed the AMBR (3GPP-UL CL).

Step 711: The UL CL sends the session establishment response to the SMF. Accordingly, the SMF receives the session establishment response.

For example, the session establishment response is the N4 session establishment response.

Step 711 is an optional step.

Optionally, the SMF further sends the AMBR (3GPP-PSA 2) to the PSA 2. The PSA 2 controls the data flow of the MA-PDU session on the data transmission channel of the 3GPP access technology based on the AMBR (3GPP-PSA 2), that is, control the maximum bit rate of the data flow (e.g., the flow 2) on the data transmission channel of the 3GPP access technology not to exceed the AMBR (3GPP-PSA 2).

If the SMF determines that the first session is the MA-PDU session in step 706, and the MA-PDU session includes the data flow in the priority-based mode, the following step 712 to step 716 are performed.

Step 712: The SMF sends a session establishment request to the PSA 1, where the session establishment request carries indication information. Accordingly, the PSA 1 receives the session establishment request.

For example, the session establishment request is an N4 session establishment request.

The indication information is used to indicate the PSA 1 to report a split percentage of the data flow in the priority-based mode. Splitting the data flow means splitting the data flow to the data transmission channel of the 3GPP access technology and the data transmission channel of the non-3GPP access technology.

Optionally, the session establishment request further includes identification information of a data flow that needs to be split, that is, include identification information of the data flow in the priority-based mode.

If the identification information of the data flow is not included, the PSA 1 needs to report split percentages of data flows in the priority-based mode.

Step 713: The PSA 1 sends a session establishment response to the SMF. Accordingly, the SMF receives the session establishment response.

For example, the session establishment response is an N4 session establishment response.

The session establishment response includes the identification information of the data flow in the priority-based mode and the split percentage of the data flow.

For example, the session establishment response includes: a flow 4 ID, 3GPP=50%, and non-3GPP=50%.

Step 714: The SMF determines the AMBR (3GPP-UL CL) and the AMBR (non-3GPP).

An implementation method of step 714 is similar to that of step 707. Different from step 707, in step 704, when the AMBR (3GPP) and the AMBR (non-3GPP) are calculated, an MBR of the data flow in the priority-based mode is considered.

Optionally, the SMF further determines the AMBR (3GPP-PSA 1) and the AMBR (3GPP-PSA 2).

The following provides descriptions with reference to an example.

For example, the PCC rule received by the SMF from the PCF includes rules of four data flows of the MA-PDU session, where rules of a data flow 1, a data flow 2, and a data flow 3 are the same as the rules of the data flow 1, the data flow 2, and the data flow 3 in step 707.

A rule of a data flow 4 is as follows:
a flow descriptor: "Application-2"; and
a steering mode: priority-based.

A meaning of the rule of the data flow 4 is as follows: A data flow of the application-2 is transmitted on the data transmission channel of the 3GPP access technology and the data transmission channel of the non-3GPP access technology based on a priority.

In addition, percentages that are received by the SMF from the PSA 1 and at which the flow 4 is transmitted on the data transmission channel of the 3GPP access technology and the data transmission channel of the non-3GPP access technology are:
3GPP: 40%; and
non-3GPP: 60%.

In addition, an MBR corresponding to the flow 4 is an MBR 4 is assumed.

Based on the foregoing example, user plane paths of the flow 1, the flow 2, and the flow 3 are respectively as follows:
the flow 1: UE-RAN-UL CL-PSA 2-DN;
the flow 2: UE-N3IWF-PSA 1-DN;
the flow 3: 20%: UE-RAN-UL CL-PSA 1-DN;
80%: UE-N3IWF-PSA 1-DN;
the flow 4: 40%: UE-RAN-UL CL-PSA 1-DN; and
60%: UE-N3IWF-PSA 1-DN.

Based on the foregoing example, the following information is obtained:

A sum of maximum bit rates of the data flows that are in the data flows of the first session and that are transmitted on the data transmission channels of the 3GPP access technology=MBR 1+MBR 3\*0.2+MBR 4\*0.4.

A sum of maximum bit rates of the data flows that are in the data flows of the first session and that are transmitted on the first data transmission channel of the 3GPP access technology=MBR 3\*0.2+MBR 4\*0.4.

A maximum bit rate of the data flow that is in the data flows of the first session and that is transmitted on the second data transmission channel of the 3GPP access technology=MBR 1.

A sum of maximum bit rates of the data flows that are in the data flows of the first session and that are transmitted on the data transmission channel of the non-3GPP access technology=MBR 2+MBR 3\*0.8+MBR 4\*0.6.

Therefore, AMBR (3GPP-UL CL)=session-AMBR\*(MBR 1+MBR 3\*0.2+MBR 4\*0.4)/(MBR 1+MBR 2+MBR 3+MBR 4).

AMBR (3GPP-PSA 1)=session-AMBR\*(MBR 3\*0.2+MBR 4\*0.4)/(MBR 1+MBR 2+MBR 3+MBR 4).

AMBR (3GPP-PSA 2)=session-AMBR\*MBR 1/(MBR 1+MBR 2+MBR 3+MBR 4).

AMBR (non-3GPP)=session-AMBR\*(MBR 2+MBR 3\*0.8+MBR 4\*0.6)/(MBR 1+MBR 2+MBR 3+MBR 4).

Step 715: The SMF sends a session modification request to the PSA 1. Accordingly, the PSA 1 receives the session modification request.

For example, the session modification request is an N4 session modification request.

The session modification request includes the AMBR (non-3GPP). The PSA 1 controls the data flows of the MA-PDU session on the data transmission channel of the non-3GPP access technology based on the AMBR (non-3GPP), that is, control the sum of the maximum bit rates of the data flows (e.g., the flow 2, the flow 3, and the flow 4) on the data transmission channel of the non-3GPP access technology not to exceed the AMBR (non-3GPP).

Optionally, the session modification request further includes the AMBR (3GPP-PSA 1). The PSA 1 controls the data flows of the MA-PDU session on the data transmission channel of the 3GPP access technology based on the AMBR (3GPP-PSA 1), that is, control the sum of the maximum bit rates of the data flows (e.g., the flow 3 and the flow 4) on the data transmission channel of the 3GPP access technology not to exceed the AMBR (3GPP-PSA 1).

Step 716: The PSA 1 sends a session modification response to the SMF. Accordingly, the SMF receives the session modification response.

For example, the session modification response is an N4 session modification response.

Step 716 is an optional step.

Step 717: The SMF sends the session establishment request to the UL CL. Accordingly, the UL CL receives the session establishment request.

For example, the session establishment request is the N4 session establishment request.

The session establishment request includes the AMBR (3GPP-UL CL). The UL CL controls the data flows of the MA-PDU session on the data transmission channels of the 3GPP access technology based on the AMBR (3GPP-UL CL), that is, control the sum of the maximum bit rates of the data flows (e.g., the flow 1 and the flow 3) on the data transmission channels of the 3GPP access technology not to exceed the (3GPP-UL CL).

Step 718: The UL CL sends the session establishment response to the SMF. Accordingly, the SMF receives the session establishment response.

For example, the session establishment response is the N4 session establishment response.

Step 718 is an optional step.

Optionally, the SMF further sends the AMBR (3GPP-PSA 2) to the PSA 2. The PSA 2 controls the data flow of the MA-PDU session on the data transmission channel of the 3GPP access technology based on the AMBR (3GPP-PSA 2), that is, control the maximum bit rate of the data flow (e.g., the flow 2) on the data transmission channel of the 3GPP access technology not to exceed the AMBR (3GPP-PSA 2).

Based on the foregoing embodiment, the SMF calculates the AMBRs of the data flows that are in the data flows of the first session and that are transmitted on the data transmission channels of the 3GPP access technology and the non-3GPP access technology, and notifies the UPFs such as the PSA 1, the UL CL, and the PSA 2 of the AMBRs. Therefore, these UPFs performs corresponding flow control based on the received AMBRs, to help improve communication quality.

Figure 8:
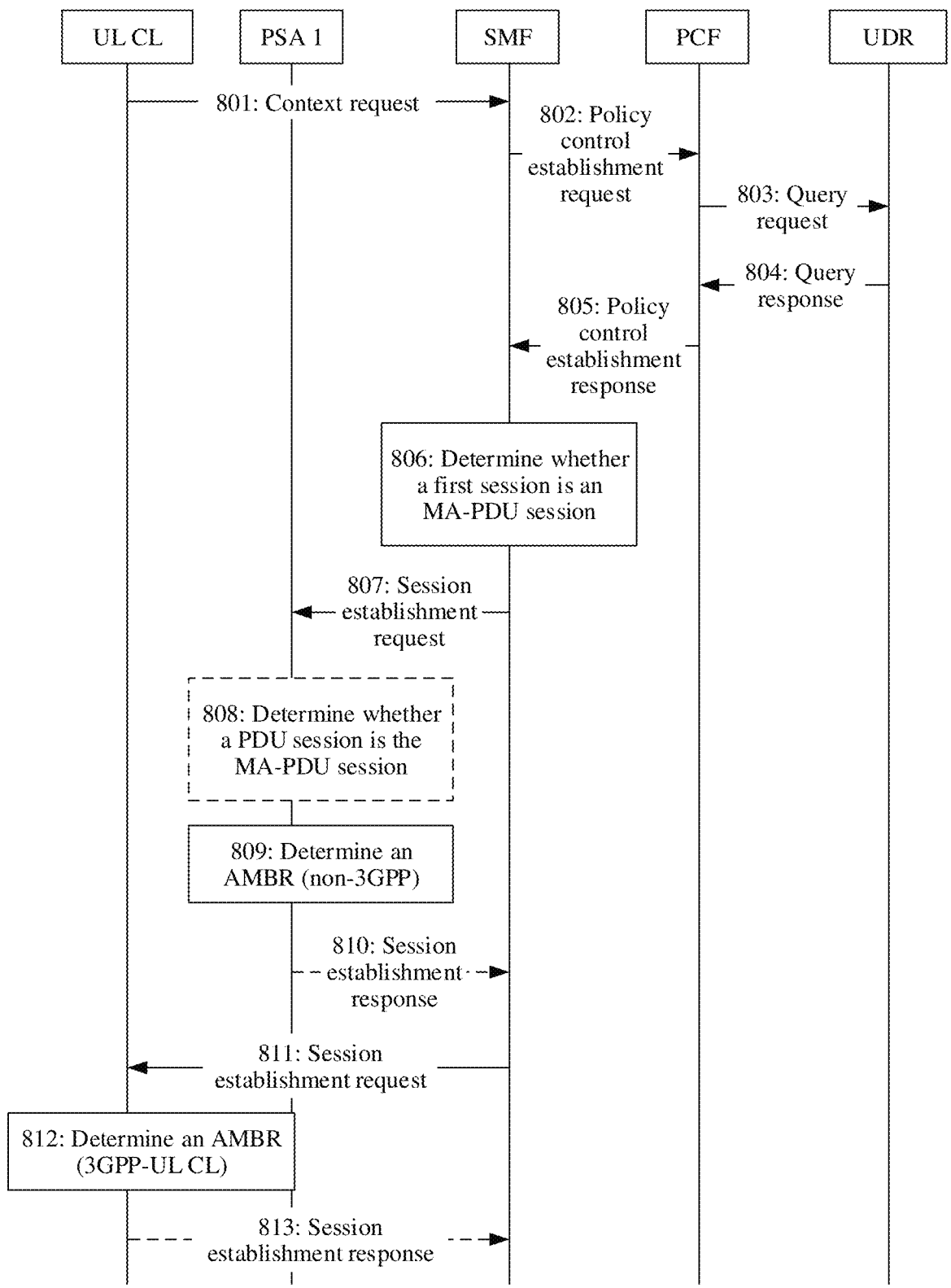
FIG. 8 is a schematic flowchart of yet another communication method according to an embodiment of this application.

The following describes the processes shown in FIG. 6B with reference to specific examples. FIG. 8 is a schematic flowchart of yet another communication method according to an embodiment of this application. The method is a specific implementation of the embodiment corresponding to FIG. 6B. In the method, a PSA 1 determines an AMBR of one or more data flows that are in data flows of a first session and that are transmitted on a data transmission channel of a non-3GPP access technology, and a UL CL determines an AMBR of data flows that are in the data flows of the first session and that are transmitted on data transmission channels of a 3GPP access technology.

FIG. 5B is used as an example for description in this embodiment, that is, the UL CL is inserted into the data transmission channels of the 3GPP access technology. An implementation method for inserting the UL CL into the data transmission channel of the non-3GPP access technology is similar to an implementation method for inserting the UL CL into the data transmission channels of the 3GPP access technology, and details are not described again.

The embodiment corresponding to FIG. 8 is described by using a PDU session (the PDU session is also referred to as the first session) establishment process as an example. In actual application, the method in this embodiment of this application alternatively is performed in a PSA changing process of a multi-PDU session in an SSC mode 3.

A PSA 2 in this embodiment is a local UPF, and a data flow passing through the PSA 2 is a local data flow and is not split to the PSA 1. Alternatively, the local data flow passes through the UL CL and the PSA 2, and does not pass through the PSA 1.

In this embodiment, the first AMBR in the embodiment corresponding to FIG. 6B is also referred to as an AMBR (non-3GPP), the second AMBR is also referred to as an AMBR (3GPP-UL CL), the third AMBR is also referred to as an AMBR (3GPP-PSA 1), and the fourth AMBR is also referred to as an AMBR (3GPP-PSA 2).

In this embodiment, the maximum bit rate of the data flow that is in the data flows of the first session and that is transmitted on the data transmission channel of the first access technology in the embodiment corresponding to FIG. 6B is also referred to as a maximum bit rate of the data flow that is in the data flows of the first session and that is transmitted on the data transmission channel of the non-3GPP access technology, the maximum bit rate of the data flow that is in the data flows of the first session and that is transmitted on the data transmission channel of the second access technology is also referred to as a maximum bit rate of the data flow that is in the data flows of the first session and that is transmitted on the data transmission channel of the 3GPP access technology, the maximum bit rate of the data flow that is in the data flows of the first session and that is transmitted on the first data transmission channel is also referred to as a maximum bit rate of a data flow that is in the data flows of the first session and that is transmitted on a first data transmission channel of the 3GPP access technology, and the maximum bit rate of the data flow that is in the data flows of the first session and that is transmitted on the second data transmission channel is also referred to as a maximum bit rate of a data flow that is in the data flows of the first session and that is transmitted on a second data transmission channel of the 3GPP access technology.

The method includes the following steps.

Step 801 to step 806 are the same as step 701 to step 706 in the embodiment. Refer to the foregoing descriptions. Details are not described again.

Step 807: The SMF sends a session establishment request to the PSA 1. Accordingly, the PSA 1 receives the session establishment request.

For example, the session establishment request is an N4 session establishment request.

Optionally, the session establishment request includes indication information, and the indication information is used to indicate the PSA 1 to determine an AMBR of one or more data flows that are in the data flows of the first session and that are transmitted on the data transmission channel of the non-3GPP access technology. In another implementation method, the indication information is used to indicate the PSA to determine an AMBR of one or more data flows that are in the data flows of the first session and that are transmitted on the data transmission channel of the non-3GPP access technology, and determine an AMBR of one or more data flows that are in the data flows of the first session and that are transmitted on the first data transmission channel of the 3GPP access technology.

Step 808: The PSA 1 determines whether the first session is the MA-PDU session.

This step is an optional step.

When the indication information is carried in step 807, the PSA 1 does not need to perform step 808.

When the indication information is not carried in step 807, step 808 is performed. When the PSA 1 determines that the first session is the MA-PDU session, step 809 is performed. That is, when determining that the first session is the MA-PDU session, the PSA 1 determines the AMBR of the one or more data flows that are in the data flows of the first session and that are transmitted on the data transmission channel of the non-3GPP access technology. Optionally, the AMBR of the one or more data flows that are in the data flows of the first session and that are transmitted on the first data transmission channel of the 3GPP access technology is further determined.

A method in which the PSA 1 determines, whether the first session is the MA-PDU session includes but is not limited to: When receiving a multi-access rule (MAR), the PSA 1 determines that the session is the MA-PDU session.

Step 809: The PSA 1 determines the AMBR (non-3GPP).

The AMBR (non-3GPP) is the AMBR of the one or more data flows that are in the data flows of the first session and that are transmitted on the data transmission channel of the non-3GPP access technology. The AMBR (non-3GPP) is sent to the PSA 1, and the PSA 1 controls the one or more data flows of the MA-PDU session on the data transmission channel of the non-3GPP access technology based on the AMBR (non-3GPP), that is, control a sum of one or more maximum bit rates of the one or more data flows on the data transmission channel of the non-3GPP access technology not to exceed the AMBR (non-3GPP).

Optionally, the PSA 1 further determines the AMBR (3GPP-PSA 1). The AMBR (3GPP-PSA 1) is the AMBR of the first data transmission channel of the 3GPP access technology. The AMBR (3GPP-PSA 1) is sent to the PSA 1, and the PSA 1 controls the one or more data flows of the MA-PDU session on the data transmission channel of the 3GPP access technology based on the AMBR (3GPP-PSA 1), that is, control a sum of one or more maximum bit rates of the one or more data flows on the data transmission channel of the 3GPP access technology not to exceed the AMBR (3GPP-PSA 1).

The example in step 714 in the embodiment corresponding to FIG. 7A and FIG. 7B is used, and the PSA 1 obtains the following information through calculation:

AMBR (non-3GPP)=session-AMBR*(MBR 2+MBR 3*0.8+MBR 4*0.6)/(MBR 1+MBR 2+MBR 3+MBR 4).

AMBR (3GPP-PSA 1)=session-AMBR*(MBR 3*0.2+MBR 4*0.4)/(MBR 1+MBR 2+MBR 3+MBR 4).

The PSA 1 controls the data flows of the MA-PDU session on the data transmission channel of the non-3GPP access technology based on the AMBR (non-3GPP), that is, control the sum of the maximum bit rates of the data flows (e.g., the flow 2, the flow 3, and the flow 4) on the data transmission channel of the non-3GPP access technology not to exceed the AMBR (non-3GPP).

Optionally, the PSA 1 controls the data flows of the MA-PDU session on the data transmission channel of the 3GPP access technology based on the AMBR (3GPP-PSA 1), that is, control the sum of the maximum bit rates of the data flows (e.g., the flow 3 and the flow 4) on the data transmission channel of the 3GPP access technology not to exceed the AMBR (3GPP-PSA 1).

Step 810: The PSA 1 sends a session establishment response to the SMF. Accordingly, the SMF receives the session establishment response.

For example, the session establishment response is an N4 session establishment response.

Step 810 is an optional step.

Step 811: The SMF sends the session establishment request to the UL CL. Accordingly, the UL CL receives the session establishment request.

For example, the session establishment request is the N4 session establishment request.

The session establishment request includes the indication information, and the indication information is used to indicate the UL CL to determine an AMBR of data flows that are in the data flows of the first session and that are transmitted on the data transmission channels of the 3GPP access technology.

Step 812: The UL CL determines the AMBR (3GPP-UL CL).

The example in step 714 in the embodiment corresponding to FIG. 7A and FIG. 7B is used, and methods in which the UL CL obtains the AMBR (3GPP-UL CL) through calculation include but are not limited to:

Method 1: When the UL CL does not know a split percentage that is of the flow 4 and that is determined by the PSA 1, AMBR (3GPP-UL CL)=session-AMBR*(MBR 1+MBR 3*0.2)/(MBR 1+MBR 2+MBR 3+MBR 4).

In the method, the UL CL controls the data flows of the MA-PDU session on the data transmission channels of the 3GPP access technology based on the AMBR (3GPP-UL CL), that is, control the sum of the maximum bit rates of the data flows (e.g., the flow 1 and the flow 3) on the data transmission channels of the 3GPP access technology not to exceed AMBR (3GPP-UL CL).

In other words, although the flow 4 passes through the UL CL, the UL CL does not control the flow.

Method 2: When the UL CL knows a split percentage that is of the flow 4 and that is determined by the PSA 1, AMBR (3GPP-UL CL)=session-AMBR*(MBR 1+MBR 3*0.2+MBR 4*0.4)/(MBR 1+MBR 2+MBR 3+MBR 4).

In the method, the UL CL controls the data flows of the MA-PDU session on the data transmission channels of the 3GPP access technology based on the AMBR (3GPP-UL CL), that is, control the sum of the maximum bit rates of the data flows (e.g., the flow 1, the flow 3, and the flow 4) on the data transmission channels of the 3GPP access technology not to exceed AMBR (3GPP-UL CL).

In this embodiment of this application, a method in which the UL CL knows the split percentage that is of the flow 4 and that is determined by the PSA 1 is not limited. For example, the indication information is added to a data packet of the flow 4. The indication information indicates the split percentage that is of the flow 4 and that is determined by the PSA 1, so that the UL CL obtains, from the data packet of the flow 4, the split percentage that is of the flow 4 and that is determined by the PSA 1. For another example, the PSA 1 sends the split percentage of the flow 4 to the UL CL through the SMF.

A difference between the method 2 and the method 1 is that the flow 4 is controlled in the method 2, and the flow 4 is not controlled in the method 1.

Step 813: The UL CL sends the session establishment response to the SMF. Accordingly, the SMF receives the session establishment response.

For example, the session establishment response is the N4 session establishment response.

Step 813 is an optional step.

Optionally, the SMF further sends the indication information to the PSA 2, to indicate the PSA 2 to determine an AMBR of one or more data flows that are in the data flows of the first session and that are transmitted on the second data transmission channel of the 3GPP access technology. In this way, the PSA 2 calculates the AMBR. The example in step 714 in the embodiment corresponding to FIG. 7A and FIG. 7B is used, and the PSA 2 obtains the following information through calculation: AMBR (3GPP-PSA 2)=session-AMBR*MBR 1/(MBR 1+MBR 2+MBR 3+MBR 4). In this way, the PSA 2 controls the data flow of the MA-PDU session on the data transmission channel of the 3GPP access technology based on the AMBR (3GPP-PSA 2), that is, control the maximum bit rate of the data flow (e.g., the flow 1) on the data transmission channel of the 3GPP access technology not to exceed the AMBR (3GPP-PSA 2).

Based on the foregoing embodiment, each UPF calculates the AMBR. The PSA 1 calculates the AMBR of the one or more data flows that are in the data flows of the first session and that are transmitted on the data transmission channel of the non-3GPP access technology and the AMBR of the one or more data flows that are in the data flows of the first session and that are transmitted on the first data transmission channel of the 3GPP access technology, the UL CL calculates the AMBR of the data flows that are in the data flows of the first session and that are transmitted on the data transmission channels of the 3GPP access technology, and the PSA 2 calculates the AMBR of the one or more data flows that are in the data flows of the first session and that are transmitted on the second data transmission channel of the 3GPP access technology. Therefore, these UPFs separately performs corresponding flow control based on corresponding AMBRs, to help improve communication quality.

The foregoing mainly describes the solutions provided in this application from the perspective of interaction between network elements. To implement the foregoing functions, each network element includes a corresponding hardware structure and/or software module for implementing each function. A person skilled in the art is easily aware that, in combination with the units and algorithm steps in the examples described in embodiments disclosed in this specification, the present disclosure is implemented by hardware or a combination of hardware and computer software. Whether a function is performed by hardware or hardware driven by computer software depends on particular applications and design constraints of the technical solutions. A person skilled in the art is configured to use different methods to implement the described functions for each particular application, but the implementation that goes beyond the scope of the present disclosure is unconsidered.

In the foregoing method embodiments, corresponding steps or operations implemented by the session management network element is further implemented by a component (for example, a chip or a circuit) used in the session management network element, corresponding steps or operations implemented by the user plane network element (for example, the UL CL, the first user plane network element, or the second user plane network element) is further implemented by a component (for example, a chip or a circuit) used in the user plane network element.

Embodiments of this application further provide an apparatus configured to implement any one of the foregoing methods. For example, an apparatus is provided, and includes units (or means) configured to implement the steps performed by the session management network element in any one of the foregoing methods. For another example, another apparatus is further provided, and includes units (or means) configured to implement the steps performed by the user plane network element in any one of the foregoing methods.

Figure 9:
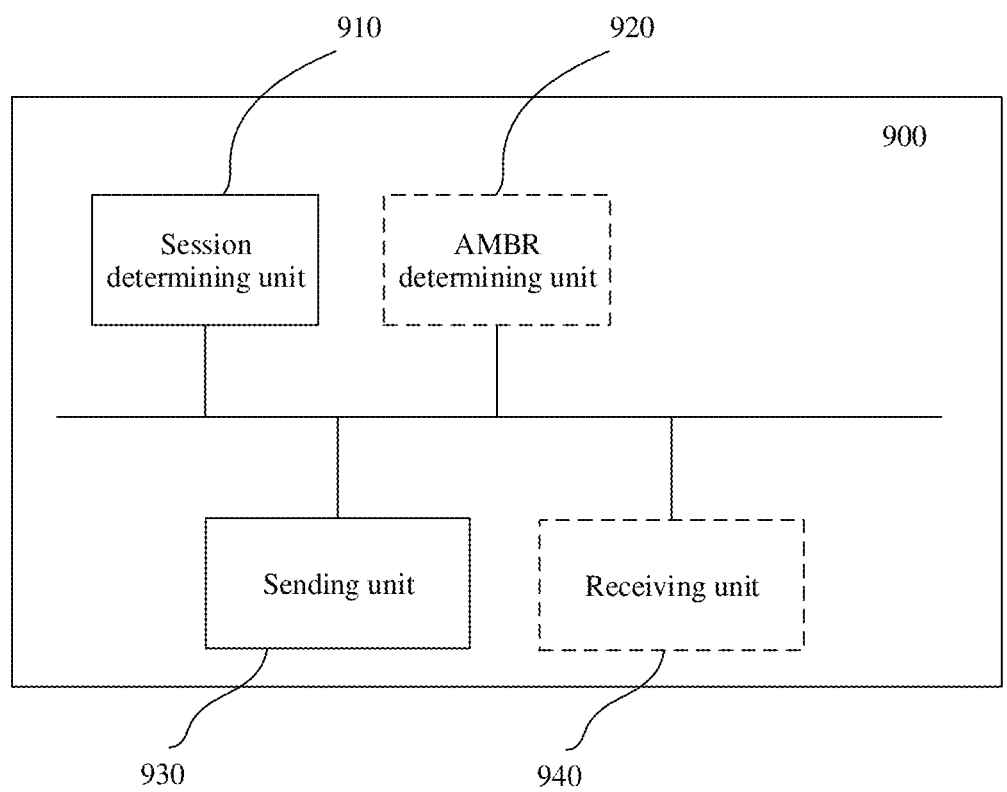
FIG. 9 is a schematic diagram of a communication apparatus according to this application.

FIG. 9 is a schematic diagram of a communication apparatus according to an embodiment of this application. The apparatus is configured to implement the corresponding steps performed by the session management network element in the foregoing method embodiments. As shown in FIG. 9, the apparatus 900 includes a session determining unit 910 and a sending unit 930. Optionally, an AMBR determining unit 920 and a receiving unit 940 are further included.

In the first embodiment:

The session determining unit 910 is configured to determine that a first session is a multi-access protocol data unit MA-PDU session, where data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is a first user plane network element, and an aggregation point of the first data transmission channel and the second data transmission channel is an uplink classifier UL CL. The AMBR determining unit 920 is configured to: determine a first aggregate maximum bit rate AMBR, and determine a second AMBR. The sending unit 930 is configured to: send the first AMBR to the first user plane network element, where the first AMBR is used by the first user plane network element to control one or more data flows that are in the data flows of the first session and that are transmitted on the data transmission channel of the first access technology; and send the second AMBR to the UL CL, where the second AMBR is used by the UL CL to control data flows that are in the data flows of the first session and that are transmitted on the data transmission channels of the second access technology.

In a possible implementation method, the session determining unit 910 is configured to: receive first indication information from a mobility management network element through the receiving unit 940, where the first indication information indicates that the first session is the MA-PDU session; or receive an access traffic steering, switching, and splitting ATSSS rule from a policy control network element through the receiving unit 940, and determine, according to the ATSSS rule, that the first session is the MA-PDU session, where the ATSSS rule includes information about the first access technology and information about the second access technology.

In a possible implementation method, the first session includes M data flows, one data flow corresponds to one maximum bit rate MBR, N data flows in the M data flows pass through the data transmission channel of the first access technology, and both M and N are positive integers. That the AMBR determining unit 920 is configured to determine a first AMBR includes: The AMBR determining unit 920 is configured to: determine, based on N MBRs corresponding to the N data flows and a split percentage at which each of the N data flows passes through the data transmission channel of the first access technology, one or more maximum bit rates of the one or more data flows that are in the data flows of the first session and that are transmitted on the data transmission channel of the first access technology; determine maximum bit rates of the data flows of the first session based on M MBRs corresponding to the M data flows; and determine the first AMBR based on a session-AMBR of the first session, the one or more maximum bit rates of the one or more data flows that are in the data flows of the first session and that are transmitted on the data transmission channel of the first access technology, and the maximum bit rates of the data flows of the first session.

In a possible implementation method, the first session includes the M data flows, one data flow corresponds to one maximum bit rate MBR, L data flows in the M data flows pass through the data transmission channels of the second access technology, and both M and L are positive integers. That the AMBR determining unit 920 is configured to determine a second AMBR includes: The AMBR determining unit 920 is configured to: determine, based on L MBRs corresponding to the L data flows and a split percentage at which each of the L data flows passes through the data transmission channel of the second access technology, maximum bit rates of the data flows that are in the data flows of the first session and that are transmitted on the data transmission channels of the second access technology; determine the maximum bit rates of the data flows of the first session based on the M MBRs corresponding to the M data flows; and determine the second AMBR based on the session-AMBR of the first session, the maximum bit rates of the data flows that are in the data flows of the first session and that are transmitted on the data transmission channels of the second access technology, and the maximum bit rates of the data flows of the first session.

In a possible implementation method, the AMBR determining unit 920 is further configured to determine a third AMBR, and the sending unit 930 is further configured to send the third AMBR to the first user plane network element, where the third AMBR is used by the first user plane network element to control one or more data flows that are in the data flows of the first session and that are transmitted on the first data transmission channel.

In a possible implementation method, the first session includes the M data flows, one data flow corresponds to one MBR, Q data flows in the M data flows pass through the first data transmission channel, and both M and Q are positive integers. That the AMBR determining unit 920 is configured to determine a third AMBR includes: The AMBR determining unit 920 is configured to: determine, based on Q MBRs corresponding to the Q data flows and a split percentage at which each of the Q data flows passes through the first data transmission channel, one or more maximum bit rates of the one or more data flows that are in the data flows of the first session and that are transmitted on the first data transmission channel; determine the maximum bit rates of the data flows of the first session based on the M MBRs corresponding to the M data flows; and determine the third AMBR based on the session-AMBR of the first session, the one or more maximum bit rates of the one or more data flows that are in the data flows of the first session and that are transmitted on the first data transmission channel, and the maximum bit rates of the data flows of the first session.

In a possible implementation method, the AMBR determining unit 920 is further configured to determine a fourth AMBR, and send the fourth AMBR to a second user plane network element, where the fourth AMBR is used by the second user plane network element to control one or more data flows that are in the data flows of the first session and that are transmitted on the second data transmission channel, and the one or more data flows that are in the data flows of the first session and that are transmitted on the second data transmission channel pass through the second user plane network element.

In a possible implementation method, the first session includes the M data flows, one data flow corresponds to one MBR, P data flows in the M data flows pass through the second data transmission channel, and both M and P are positive integers. That the AMBR determining unit 920 is configured to determine a fourth AMBR includes: The AMBR determining unit 920 is configured to: determine, based on P MBRs corresponding to the P data flows, one or more maximum bit rates of the one or more data flows that are in the data flows of the first session and that are transmitted on the second data transmission channel; determine the maximum bit rates of the data flows of the first session based on the M MBRs corresponding to the M data flows; and determine the fourth AMBR based on the session-AMBR of the first session, the one or more maximum bit rates of the one or more data flows that are in the data flows of the first session and that are transmitted on the second data transmission channel, and the maximum bit rates of the data flows of the first session.

In a possible implementation method, the data flows of the first session include a first data flow, and a steering mode of the first data flow is a priority-based mode. The sending unit 930 is further configured to: send second indication information to the first user plane network element, where the second indication information is used to request a split percentage of the first data flow. The receiving unit 940 is configured to receive the split percentage of the first data flow from the first user plane network element.

In the second embodiment:

The session determining unit 910 is configured to determine that a first session is a multi-access protocol data unit MA-PDU session, where data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is a first user plane network element, and an aggregation point of the first data transmission channel and the second data transmission channel is an uplink classifier UL CL. The sending unit 930 is configured to: send first indication information to the first user plane network element, where the first indication information is used to indicate the first user plane network element to determine a first aggregate maximum bit rate AMBR, and the first AMBR is used by the first user plane network element to control one or more data flows that are in the data flows of the first session and that are transmitted on the data transmission channel of the first access technology; and send second indication information to the UL CL, where the second indication information is used to indicate the UL CL to determine a second AMBR, and the second AMBR is used by the UL CL to control data flows that are in the data flows of the first session and that are transmitted on the data transmission channels of the second access technology.

In a possible implementation method, the session determining unit 910 is configured to: receive third indication information from a mobility management network element through the receiving unit 940, where the third indication information indicates that the first session is the MA-PDU session; or receive an access traffic steering, switching, and splitting ATSSS rule from a policy control network element through the receiving unit 940, and determine, according to the ATSSS rule, that the first session is the MA-PDU session, where the ATSSS rule includes information about the first access technology and information about the second access technology.

In a possible implementation method, the first indication information is further used to indicate the first user plane network element to determine a third AMBR, where the third AMBR is used by the first user plane network element to control one or more data flows that are in the data flows of the first session and that are transmitted on the first data transmission channel. Alternatively, the sending unit 930 is further configured to send fourth indication information to the first user plane network element, where the fourth indication information is used to indicate to determine a third AMBR.

In a possible implementation method, the sending unit 930 is further configured to send fifth indication information to a second user plane network element, where the fifth indication information is used to indicate the second user plane network element to determine a fourth AMBR, the fourth AMBR is used by the second user plane network element to control one or more data flows that are in the data flows of the first session and that are transmitted on the second data transmission channel, and the one or more data flows that are in the data flows of the first session and that are transmitted on the second data transmission channel pass through the second user plane network element.

The foregoing units is further referred to as modules, circuits, or the like, and the foregoing units are independently disposed, or is completely or partially integrated.

In a possible implementation, the sending unit 930 and the receiving unit 940 alternatively is implemented by a transceiver unit, or the sending unit 930 and the receiving unit 940 is collectively referred to as a transceiver unit. The session determining unit 910 and the AMBR determining unit 920 is further implemented by using a processing unit, or the session determining unit 910 and the AMBR determining unit 920 is collectively referred to as a processing unit.

The sending unit 930 and the receiving unit 940 or the transceiver unit is further referred to as a communication interface, and the processing unit is further referred to as a processor.

Optionally, the communication apparatus 900 further includes a storage unit. The storage unit is configured to store data or instructions (which is further referred to as code or a program). The foregoing units interacts with or be coupled to the storage unit, to implement a corresponding method or function. For example, the processing unit reads the data or the instructions in the storage unit, to enable the communication apparatus to implement the methods in the foregoing embodiments.

Figure 10:
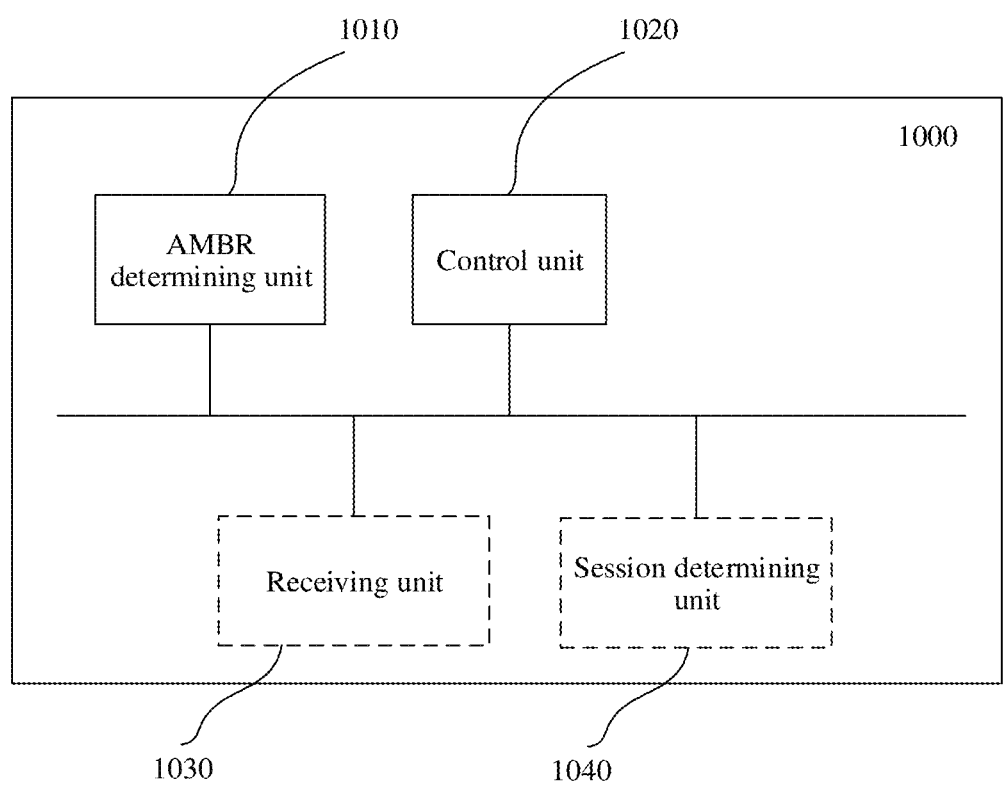
FIG. 10 is a schematic diagram of another communication apparatus according to this application.

FIG. 10 is a schematic diagram of a communication apparatus according to an embodiment of this application. The apparatus is configured to implement the corresponding steps performed by the first user plane network element in the foregoing method embodiments. As shown in FIG. 10, the apparatus 1000 includes an AMBR determining unit 1010 and a control unit 1020. Optionally, the apparatus further includes a receiving unit 1030 and a session determining unit 1040.

The AMBR determining unit 1010 is configured to determine a first aggregate maximum bit rate AMBR of a first session, where the first session is a multi-access protocol data unit MA-PDU session, data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is the first user plane network element, and an aggregation point of the first data transmission channel and the second data transmission channel is an uplink classifier UL CL. The control unit 1020 is configured to control, based on the first AMBR, one or more data flows that are in the data flows of the first session and that are transmitted on the data transmission channel of the first access technology.

In a possible implementation, the receiving unit 1030 is configured to receive first indication information, where the first indication information is used to indicate the first user plane network element to determine the first AMBR. Alternatively, the session determining unit 1040 is configured to determine that the first session is the MA-PDU session.

In a possible implementation, the session determining unit 1040 is configured to: receive sixth indication information from a mobility management network element through the receiving unit 1030, where the sixth indication information indicates that the first session is the MA-PDU session; or receive an access traffic steering, switching, and splitting ATSSS rule from a policy control network element through the receiving unit 1030, and determine, according to the ATSSS rule, that the first session is the MA-PDU session, where the ATSSS rule includes information about the first access technology and information about the second access technology.

In a possible implementation, the first session includes M data flows, one data flow corresponds to one maximum bit rate MBR, N data flows in the M data flows pass through the data transmission channel of the first access technology, and both M and N are positive integers. The AMBR determining unit 1010 is configured to: determine, based on N MBRs corresponding to the N data flows and a split percentage at which each of the N data flows passes through the data transmission channel of the first access technology, one or more maximum bit rates of the one or more data flows that are in the data flows of the first session and that are transmitted on the data transmission channel of the first access technology; determine maximum bit rates of the data flows of the first session based on M MBRs corresponding to the M data flows; and determine the first AMBR based on a session-AMBR of the first session, the one or more maximum bit rates of the one or more data flows that are in the data flows of the first session and that are transmitted on the data transmission channel of the first access technology, and the maximum bit rates of the data flows of the first session.

In a possible implementation, the first session includes the M data flows, one data flow corresponds to one MBR, Q data flows in the M data flows pass through the first data transmission channel, and both M and Q are positive integers. The AMBR determining unit 1010 is further configured to: determine, based on Q MBRs corresponding to the Q data flows and a split percentage at which each of the Q data flows passes through the first data transmission channel, one or more maximum bit rates of one or more data flows that are in the data flows of the first session and that are transmitted on the first data transmission channel; determine the maximum bit rates of the data flows of the first session based on the M MBRs corresponding to the M data flows; determine the third AMBR based on the session-AMBR of the first session, the one or more maximum bit rates of the one or more data flows that are in the data flows of the first session and that are transmitted on the first data transmission channel, and the maximum bit rates of the data flows of the first session; and control, based on the third AMBR, the one or more data flows that are in the data flows of the first session and that are transmitted on the first data transmission channel.

The foregoing units is further referred to as modules, circuits, or the like, and the foregoing units are independently disposed, or is completely or partially integrated.

In some possible implementations, the AMBR determining unit 1010, the control unit 1020, and the session determining unit 1040 is further implemented by using a processing unit, or the AMBR determining unit 1010, the control unit 1020, and the session determining unit 1040 is collectively referred to as a processing unit.

The receiving unit 1030 is further referred to as a communication interface, and the processing unit is further referred to as a processor.

Optionally, the communication apparatus 1000 further includes a storage unit. The storage unit is configured to store data or instructions (which is further referred to as code or a program). The foregoing units interacts with or be coupled to the storage unit, to implement a corresponding method or function. For example, the processing unit reads the data or the instructions in the storage unit, to enable the communication apparatus to implement the methods in the foregoing embodiments.

Figure 11:
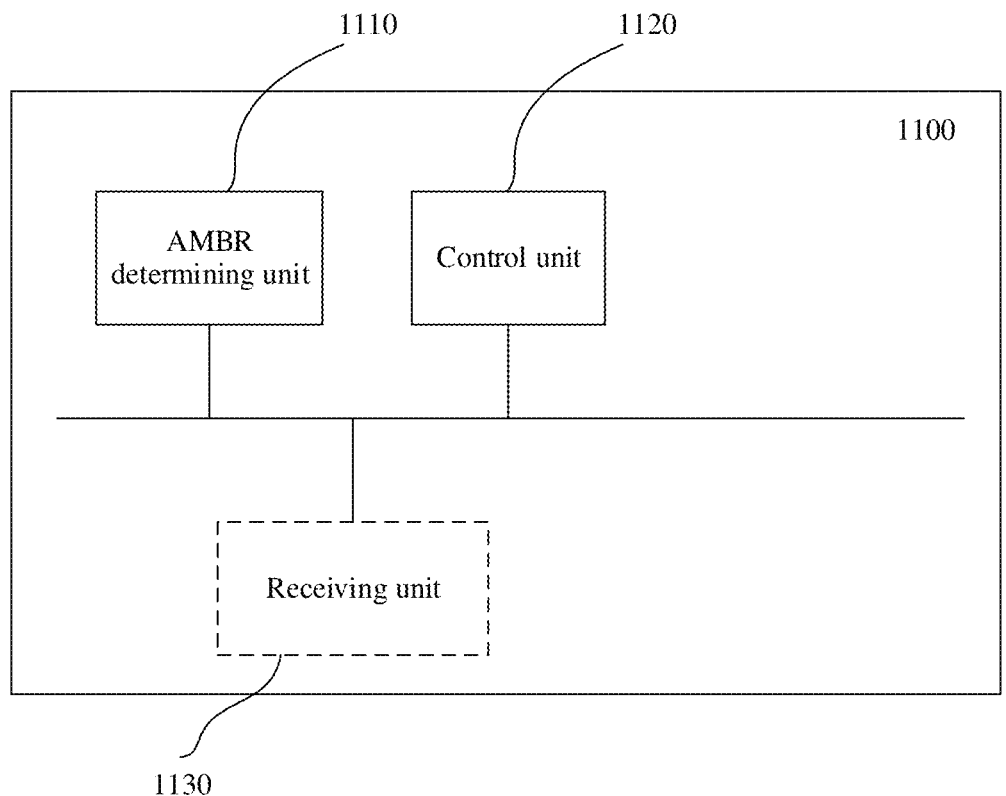
FIG. 11 is a schematic diagram of still another communication apparatus according to this application.

FIG. 11 is a schematic diagram of a communication apparatus according to an embodiment of this application. The apparatus is configured to implement the corresponding steps performed by the second user plane network element or the UL CL in the foregoing method embodiments. As shown in FIG. 11, the apparatus 1100 includes an AMBR determining unit 1110 and a control unit 1120. Optionally, a receiving unit 1130 is further included.

In the first embodiment, the apparatus is configured to implement the corresponding steps performed by the second user plane network element in the foregoing method embodiments.

The AMBR determining unit 1110 is configured to determine a fourth aggregate maximum bit rate AMBR of a first session, where the first session is a multi-access protocol data unit MA-PDU session, data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is a first user plane network element, an aggregation point of the first data transmission channel and the second data transmission channel is an uplink classifier UL CL, and one or more data flows that are in the data flows of the first session and that are transmitted on the second data transmission channel passes through the second user plane network element. The control unit 1120 is configured to control, based on the fourth AMBR, the one or more data flows that are in the data flows of the first session and that are transmitted on the second data transmission channel.

In a possible implementation, the receiving unit 1130 is configured to receive fifth indication information, where the fifth indication information is used to indicate the second user plane network element to determine the fourth AMBR.

In a possible implementation, the first session includes M data flows, one data flow corresponds to one maximum bit rate MBR, P data flows in the M data flows pass through the second data transmission channel, and both M and P are positive integers. The AMBR determining unit 1110 is configured to: determine, based on P MBRs corresponding to the P data flows, one or more maximum bit rates of the one or more data flows that are in the data flows of the first session and that are transmitted on the second data transmission channel; determine maximum bit rates of the data flows of the first session based on M MBRs corresponding to the M data flows; and determine the fourth AMBR based on a session-AMBR of the first session, the one or more maximum bit rates of the one or more data flows that are in the data flows of the first session and that are transmitted on the second data transmission channel, and the maximum bit rates of the data flows of the first session.

In the second embodiment, the apparatus is configured to implement the corresponding steps performed by the UL CL in the foregoing method embodiments:

The AMBR determining unit 1110 is configured to determine a second aggregate maximum bit rate AMBR of a first session, where the first session is a multi-access protocol data unit MA-PDU session, data flows of the first session are transmitted on a data transmission channel of a first access technology and data transmission channels of a second access technology, the data transmission channels of the second access technology include a first data transmission channel and a second data transmission channel, an aggregation point of the data transmission channel of the first access technology and the first data transmission channel is a first user plane network element, and an aggregation point of the first data transmission channel and the second data transmission channel is the uplink classifier UL CL. The control unit 1120 is configured to control, based on the second AMBR, data flows that are in the data flows of the first session and that are transmitted on the data transmission channels of the second access technology.

In a possible implementation, the receiving unit 1130 is configured to receive second indication information, where the second indication information is used to indicate the UL CL to determine the second AMBR.

In a possible implementation, the first session includes M data flows, one data flow corresponds to one maximum bit rate MBR, L data flows in the M data flows pass through the data transmission channels of the second access technology, and both M and L are positive integers. The AMBR determining unit 1110 is configured to: determine, based on L MBRs corresponding to the L data flows and a split percentage at which each of the L data flows passes through the data transmission channel of the second access technology, maximum bit rates of the data flows that are in the data flows of the first session and that are transmitted on the data transmission channels of the second access technology; determine maximum bit rates of the data flows of the first session based on M MBRs corresponding to the M data flows; and determine the second AMBR based on a session-AMBR of the first session, the maximum bit rates of the data flows that are in the data flows of the first session and that are transmitted on the data transmission channels of the second access technology, and the maximum bit rates of the data flows of the first session.

In a possible implementation, data flows of the first session that pass through the first data transmission channel include a first data flow, and a split percentage of the first data flow between the data transmission channel of the first access technology and the first data transmission channel is determined by the first user plane network element. The receiving unit 1130 is configured to receive a downlink data packet from the first user plane network element, where the downlink data packet carries the split percentage.

The foregoing units is further referred to as modules, circuits, or the like, and the foregoing units are independently disposed, or is completely or partially integrated.

In some possible implementations, the AMBR determining unit 1110 and the control unit 1120 is further implemented by using a processing unit, or the AMBR determining unit 1110 and the control unit 1120 is collectively referred to as a processing unit.

The receiving unit 1130 is further referred to as a communication interface, and the processing unit is further referred to as a processor.

Optionally, the communication apparatus 1100 further includes a storage unit. The storage unit is configured to store data or instructions (which is further referred to as code or a program). The foregoing units interacts with or be coupled to the storage unit, to implement a corresponding method or function. For example, the processing unit reads the data or the instructions in the storage unit, to enable the communication apparatus to implement the methods in the foregoing embodiments.

Division of the foregoing apparatus into the units is merely logical function division. In an actual implementation, all or some of the units are integrated into a physical entity, or is physically separate. In addition, the units in the apparatus is implemented in a form of software invoked by a processing element, or is implemented in a form of hardware. Alternatively, some units are implemented in a form of software invoked by a processing element, and some units are implemented in a form of hardware. For example, each unit is separately disposed processing elements, or is integrated into a chip of the apparatus for implementation. In addition, each unit is alternatively stored in a memory in a program form, and is invoked by a processing element of the apparatus to perform a function of the unit. In addition, all or some of the units are integrated or is implemented separately. The processing element herein is further referred to as a processor, and is an integrated circuit having a signal processing capability. In an implementation process, the steps in the foregoing method or the foregoing units are implemented by using a hardware integrated logic circuit in the processor element, or is implemented in a form of software invoked by the processing element.

For example, a unit in any one of the foregoing apparatuses are one or more integrated circuits configured to implement the foregoing method, for example, one or more application-specific integrated circuits (ASICs), one or more microprocessors (DSPs), one or more field programmable gate arrays (FPGAs), or a combination of at least two of the integrated circuits. For another example, when the units in the apparatus is implemented in a form of scheduling a program by a processing element, the processing element is a general-purpose processor, for example, a central processing unit (CPU) or another processor that invokes a program. For still another example, the units are integrated and implemented in a form of a system-on-a-chip (SoC).

The foregoing unit for receiving (for example, the receiving unit) is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing unit for sending (for example, the sending unit) is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 12:
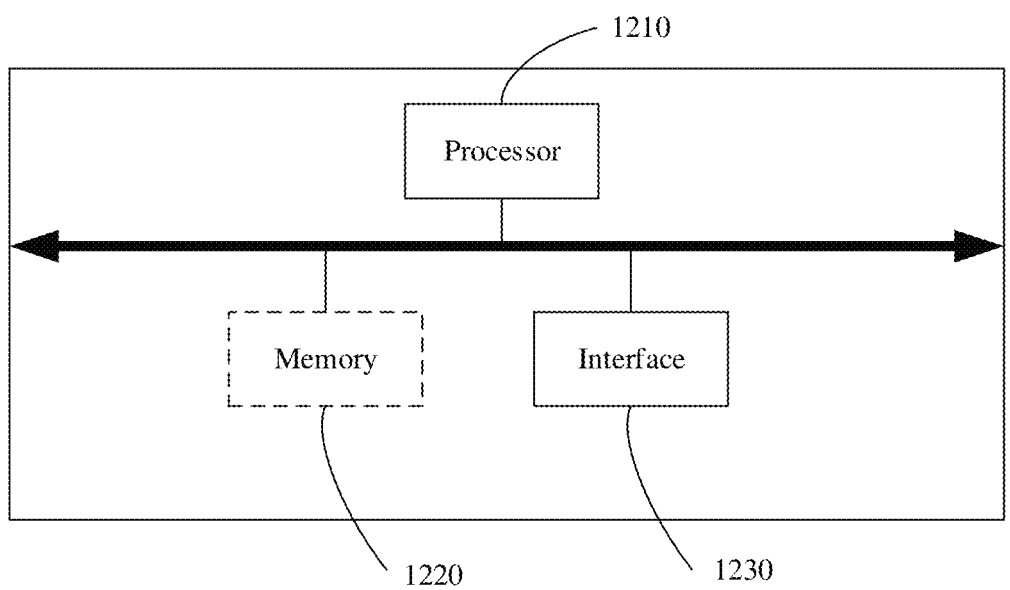
FIG. 12 is a schematic diagram of yet another communication apparatus according to this application.

FIG. 12 is a schematic diagram of yet another communication apparatus according to an embodiment of this application. The communication apparatus is configured to implement the operations of the session management network element, the first user plane network element, the second user plane network element, or the UL CL in the foregoing embodiments. As shown in FIG. 12, the communication apparatus includes a processor 1210 and an interface 1230, and optionally, further includes a memory 1220. The interface 1230 is configured to communicate with another device.

The method performed by the communication apparatus in the foregoing embodiments are implemented by the processor 1210 by invoking a program stored in a memory (which is the memory 1220 in the communication apparatus, or is an external memory). That is, an apparatus used for communication apparatus includes the processor 1210. The processor 1210 invokes the program in the memory, to perform the methods performed by the session management network element, the first user plane network element, the second user plane network element, or the UL CL in the foregoing method embodiments. The processor herein is an integrated circuit having a signal processing capability, for example, a CPU.

All or some of the foregoing embodiments are implemented by using software, hardware, firmware, or any combination thereof. When software is used to implement the embodiments, all or some of the embodiments are implemented in a form of a computer program product. The computer program product includes one or more computer instructions. When the computer program instructions are loaded and executed on a computer, all or some of the procedures or the functions according to embodiments of this application are generated. The computer is a general-purpose computer, a dedicated computer, a computer network, or another programmable apparatus. The computer instructions are stored in a computer-readable storage medium or is transmitted from one computer-readable storage medium to another computer-readable storage medium. For example, the computer instructions are transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by a computer, or a data storage device, for example, a server or a data center, integrating one or more usable media. The usable medium is a magnetic medium (for example, a floppy disk, a hard disk drive, or a magnetic tape), an optical medium (for example, a DVD), a semiconductor medium (for example, a solid-state drive (SSD)), or the like.

The various illustrative logical units and circuits described in embodiments of this application implements or operates the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor is a microprocessor. Optionally, the general-purpose processor alternatively is any conventional processor, controller, microcontroller, or state machine. The processor is further implemented by a combination of computing apparatuses, such as a digital signal processor and a microprocessor, a plurality of microprocessors, one or more microprocessors with a digital signal processor core, or any other similar configuration.

In one or more example designs, the functions described in this application is implemented by using hardware, software, firmware, or any combination thereof. If the functions are implemented by using software, these functions are stored in a computer-readable medium or transmitted on a computer-readable medium in a form of one or more instructions or code. The computer-readable medium includes a computer storage medium or a communication medium that enables a computer program to move from one place to another place. The storage medium is any available medium accessible by a general-purpose computer or a special computer. For example, such a computer-readable medium includes but is not limited to a RAM, a ROM, an EEPROM, a CD-ROM, or another optical disc storage, a disk storage or another magnetic storage apparatus, or any other medium that is used to carry or store program code, where the program code is in an instruction form or a data structure form or in a form that is read by a general-purpose or special computer or a general-purpose or special processor. In addition, any connection is appropriately determined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in the determined computer-readable medium. The disk (disk) and the disc (disc) include a compact disc, a laser disc, an optical disc, a digital versatile disc (English: Digital Versatile Disc, DVD for short), a floppy disk, and a Blu-ray disc. The disc usually copies data by a magnetic means, and the disk optically copies data by a laser means. The foregoing combination alternatively is included in the computer-readable medium.

A person of skill in the art is aware that in one or more of the foregoing examples, the functions described in this application is implemented by using hardware, software, firmware, or any combination thereof. When the functions are implemented by software, the foregoing functions are stored in a computer-readable medium or transmitted as one or more instructions or code in the computer-readable medium. The computer-readable medium includes a computer storage medium and a communication medium. The communication medium includes any medium that facilitates transmission of a computer program from one place to another. The storage medium is any available medium accessible to a general purpose or dedicated computer.

Although this application is described with reference to specific features and embodiments thereof. Various modifications and combinations are made to without departing from the spirit and scope of this application. Correspondingly, the specification and accompanying drawings are merely example descriptions of this application defined by the appended claims, and are considered as any of or all modifications, variations, combinations or equivalents that cover the scope of this application. A person skilled in the art is able to make various modifications and variations to this application without departing from the scope of this application. In this way, this application is intended to cover these modifications and variations of this application provided that they fall within the scope of the claims of this application and equivalent technologies.

What is claimed is:

1. A communication method, comprising:
   determining that a first session is a multi-access protocol data unit (MA-PDU) session, wherein data flows of the first session are transmitted on a data transmission channel of a first access technology and data transmission channels of a second access technology, the data transmission channels of the second access technology include a first data transmission channel and a second data transmission channel;
   an aggregation point of the data transmission channel of the first access technology and the first data transmission channel is a first user plane network element; and
   an aggregation point of the first data transmission channel and the second data transmission channel is an uplink classifier (UL CL);
   sending a first aggregate maximum bit rate (AMBR) to the first user plane network element, wherein:
   the first AMBR is used by the first user plane network element to control one or more data flows that are in the data flows of the first session and that are transmitted on the data transmission channel of the first access technology;
   sending a second AMBR to the UL CL, wherein:
   the second AMBR is used by the UL CL to control data flows that are in the data flows of the first session and that are transmitted on the data transmission channels of the second access technology.

2. The method according to claim 1, wherein the determining that a first session is an MA-PDU session comprises:
   receiving first indication information from a mobility management network element, wherein the first indication information indicates that the first session is the MA-PDU session; or
   receiving an access traffic steering, switching, and splitting (ATSSS) rule from a policy control network element; and
   determining, according to the ATSSS rule, that the first session is the MA-PDU session, wherein the ATSSS rule includes information about the first access technology and information about the second access technology.

3. The method according to claim 1, wherein the first session includes M data flows, where:
   one data flow corresponds to one maximum bit rate MBR;
   N data flows in the M data flows pass through the data transmission channel of the first access technology; and
   both M and N are positive integers; and
   before the sending of the first AMBR the method further comprising:
   determining the first AMBR, the determining the first AMBR comprises:
   determining, based on N MBRs corresponding to the N data flows and a split percentage at which each of the N data flows passes through the data transmission channel of the first access technology, one or more maximum bit rates of the one or more data flows that are in the data flows of the first session and that are transmitted on the data transmission channel of the first access technology; and
   determining the first AMBR is based on a session-AMBR of the first session, the one or more maximum bit rates of the one or more data flows that are in the data flows of the first session and that are transmitted on the data transmission channel of the first access technology, and maximum bit rates of the data flows of the first session, wherein the maximum bit rates of the data flows of the first session are determined based on M MBRs corresponding to the M data flows.

4. The method according to claim 1, wherein the first session includes M data flows, where:
one data flow corresponds to one MBR;
L data flows in the M data flows pass through the data transmission channels of the second access technology; and
both M and L are positive integers; and
before the sending of the second AMBR the method further comprising: determining the second AMBR, the determining the second AMBR comprises:
determining, based on L MBRs corresponding to the L data flows and a split percentage at which each of the L data flows passes through the data transmission channel of the second access technology, maximum bit rates of data flows that are in the data flows of the first session and that are transmitted on the data transmission channels of the second access technology; and
determining the second AMBR based on a session-AMBR of the first session, the maximum bit rates of the data flows that are in the data flows of the first session and that are transmitted on the data transmission channels of the second access technology, and the maximum bit rates of the data flows of the first session, wherein the maximum bit rates of the data flows of the first session are determined based on the M MBRs corresponding to the M data flows.

5. The method according to claim 1, further comprising:
sending a third AMBR to the first user plane network element, wherein the third AMBR is used by the first user plane network element to control the one or more data flows that are in the data flows of the first session and that are transmitted on the first data transmission channel.

6. The method according to claim 5, wherein the first session comprises:
M data flows;
one data flow corresponds to one MBR;
Q data flows in the M data flows pass through the first data transmission channel; and
both M and Q are positive integers; and
before the sending of the third AMBR the method further comprising:
determining the third AMBR, the determining the third AMBR comprises:
determining, based on Q MBRs corresponding to the Q data flows and a split percentage at which each of the Q data flows passes through the first data transmission channel, one or more maximum bit rates of the one or more data flows that are in the data flows of the first session and that are transmitted on the first data transmission channel; and
determining the third AMBR based on a session-AMBR of the first session, the one or more maximum bit rates of the one or more data flows that are in the data flows of the first session and that are transmitted on the first data transmission channel, and the maximum bit rates of the data flows of the first session, wherein the maximum bit rates of the data flows of the first session are determined based on the M MBRs corresponding to the M data flows.

7. The method according to claim 1, further comprising:
sending a fourth AMBR to a second user plane network element, wherein the fourth AMBR is used by the second user plane network element to control one or more data flows that are in the data flows of the first session and that are transmitted on the second data transmission channel, and the one or more data flows that are in the data flows of the first session and that are transmitted on the second data transmission channel pass through the second user plane network element.

8. The method according to claim 7, wherein the first session comprises:
M data flows;
one data flow corresponds to one MBR;
P data flows in the M data flows pass through the second data transmission channel; and
both M and P are positive integers; and
before sending fourth AMBR the method further comprising:
determining the fourth AMBR, the determining the fourth AMBR comprises:
determining, based on P MBRs corresponding to the P data flows, one or more maximum bit rates of the one or more data flows that are in the data flows of the first session and that are transmitted on the second data transmission channel; and
determining the fourth AMBR based on a session-AMBR of the first session, the one or more maximum bit rates of the one or more data flows that are in the data flows of the first session and that are transmitted on the second data transmission channel, and the maximum bit rates of the data flows of the first session, wherein the maximum bit rates of the data flows of the first session are determined based on the M MBRs corresponding to the M data flows.

9. The method according to claim 1, wherein the data flows of the first session comprise:
a first data flow; and
a steering mode of the first data flow is a priority-based mode; and
the method further comprises:
sending second indication information to the first user plane network element, wherein the second indication information is used to request a split percentage of the first data flow; and
receiving the split percentage of the first data flow from the first user plane network element.

10. A communication apparatus, comprising:
a memory storing executable instructions;
a processor configured to execute the executable instructions to perform operations to:
determine that a first session is a multi-access protocol data unit (MA-PDU) session, wherein:
data flows of the first session are transmitted on a data transmission channel of a first access technology and data transmission channels of a second access technology;
the data transmission channels of the second access technology include a first data transmission channel and a second data transmission channel;
an aggregation point of the data transmission channel of the first access technology and the first data transmission channel is a first user plane network element; and
an aggregation point of the first data transmission channel and the second data transmission channel is an uplink classifier (UL CL);

send a first aggregate maximum bit rate (AMBR) to the first user plane network element, wherein:
the first AMBR is used by the first user plane network element to control one or more data flows that are in the data flows of the first session and that are transmitted on the data transmission channel of the first access technology; and
send a second AMBR to the UL CL, wherein:
the second AMBR is used by the UL CL to control data flows that are in the data flows of the first session and that are transmitted on the data transmission channels of the second access technology.

11. The communication apparatus according to claim 10, wherein the operation of determining that a first session is an MA-PDU session comprises:
receive first indication information from a mobility management network element, wherein the first indication information indicates that the first session is the MA-PDU session; or
receive an access traffic steering, switching, and splitting (ATSSS) rule from a policy control network element; and
determine, according to the ATSSS rule, that the first session is the MA-PDU session, wherein the ATSSS rule includes information about the first access technology and information about the second access technology.

12. The communication apparatus according to claim 10, wherein the first session includes:
M data flows;
one data flow corresponds to one MBR;
L data flows in the M data flows pass through the data transmission channels of the second access technology; and
both M and L are positive integers; and
wherein the executable instructions further cause the processor to perform operations that include:
determine the second AMBR, the determining the second AMBR comprises:
determine, based on L MBRs corresponding to the L data flows and a split percentage at which each of the L data flows passes through the data transmission channel of the second access technology, maximum bit rates of the data flows that are in the data flows of the first session and that are transmitted on the data transmission channels of the second access technology; and
determine the second AMBR based on a session-AMBR of the first session, the maximum bit rates of the data flows that are in the data flows of the first session and that are transmitted on the data transmission channels of the second access technology, and the maximum bit rates of the data flows of the first session, wherein the maximum bit rates of the data flows of the first session are determined based on the M MBRs corresponding to the M data flows.

13. The communication apparatus according to claim 10, wherein the processor configured to execute the executable instructions to further perform operations to:
send a third AMBR to the first user plane network element, wherein the third AMBR is used by the first user plane network element to control the one or more data flows that are in the data flows of the first session and that are transmitted on the first data transmission channel.

14. The communication apparatus according to claim 10, wherein the processor configured to execute the executable instructions to further perform operations to:
send a fourth AMBR to a second user plane network element, wherein the fourth AMBR is used by the second user plane network element to control one or more data flows that are in the data flows of the first session and that are transmitted on the second data transmission channel, and the one or more data flows that are in the data flows of the first session and that are transmitted on the second data transmission channel pass through the second user plane network element.

15. The communication apparatus according to claim 10, wherein the data flows of the first session comprise:
a first data flow; and
a steering mode of the first data flow is a priority-based mode; and
wherein the processor configured to execute the executable instructions to further perform operations to:
send second indication information to the first user plane network element, wherein the second indication information is used to request a split percentage of the first data flow; and
receive the split percentage of the first data flow from the first user plane network element.

16. A communication system, comprising:
a session management network element;
a first user plane network element; and
an uplink classifier (UL CL), wherein the session management network element is configured to:
determine that a first session is a multi-access protocol data unit (MA-PDU) session, wherein data flows of the first session are transmitted on a data transmission channel of a first access technology and data transmission channels of a second access technology, the data transmission channels of the second access technology includes:
a first data transmission channel and a second data transmission channel;
an aggregation point of the data transmission channel of the first access technology and the first data transmission channel is the first user plane network element; and
an aggregation point of the first data transmission channel and the second data transmission channel is the UL CL;
send a first AMBR to the first user plane network element, wherein the first AMBR is used by the first user plane network element to control one or more data flows that are in the data flows of the first session and that are transmitted on the data transmission channel of the first access technology; and
send a second AMBR to the UL CL, wherein the second AMBR is used by the UL CL to control data flows that are in the data flows of the first session and that are transmitted on the data transmission channels of the second access technology;
wherein:
the first user plane network element is configured to control, based on the first AMBR, the one or more data flows that are in the data flows of the first session and that are transmitted on the data transmission channel of the first access technology; and
the UL CL is configured to control, based on the second AMBR, the data flows that are in the data flows of the first session and that are transmitted on the data transmission channels of the second access technology.

17. The communication system according to claim 16, wherein that the session management network element is configured to determine that a first session is an MA-PDU session specifically comprises:
receive first indication information from a mobility management network element, wherein the first indication information indicates that the first session is the MA-PDU session; or
receive an access traffic steering, switching, and splitting (ATSSS) rule from a policy control network element; and
determine, according to the ATSSS rule, that the first session is the MA-PDU session, wherein the ATSSS rule includes information about the first access technology and information about the second access technology.

18. The communication system according to claim 16, wherein the first session comprises:
M data flows;
one data flow corresponds to one maximum bit rate MBR;
N data flows in the M data flows pass through the data transmission channel of the first access technology; and
both M and N are positive integers; and
the session management network element is configured to determine the first AMBR comprises:
determine, based on N MBRs corresponding to the N data flows and a split percentage at which each of the N data flows passes through the data transmission channel of the first access technology, one or more maximum bit rates of the one or more data flows that are in the data flows of the first session and that are transmitted on the data transmission channel of the first access technology; and
determine the first AMBR based on a session-AMBR of the first session, the one or more maximum bit rates of the one or more data flows that are in the data flows of the first session and that are transmitted on the data transmission channel of the first access technology, and maximum bit rates of the data flows of the first session, wherein the maximum bit rates of the data flows of the first session are determined based on M MBRs corresponding to the M data flows.

19. The communication system according to claim 16, wherein the first session comprises:
the M data flows;
one data flow corresponds to one MBR;
L data flows in the M data flows pass through the data transmission channels of the second access technology; and
both M and L are positive integers; and
the session management network element is configured to determine the second AMBR, the determination includes:
determine, based on L MBRs corresponding to the L data flows and a split percentage at which each of the L data flows passes through the data transmission channel of the second access technology, maximum bit rates of the data flows that are in the data flows of the first session and that are transmitted on the data transmission channels of the second access technology; and
determine the second AMBR based on a session-AMBR of the first session, the maximum bit rates of the data flows that are in the data flows of the first session and that are transmitted on the data transmission channels of the second access technology, and the maximum bit rates of the data flows of the first session, wherein the maximum bit rates of the data flows of the first session are determined based on the M MBRs corresponding to the M data flows.

20. The communication system according to claim 16, wherein the session management network element is further configured to:
send a third AMBR to the first user plane network element, wherein the third AMBR is used by the first user plane network element to control the one or more data flows that are in the data flows of the first session and that are transmitted on the first data transmission channel.

* * * * *

UNITED STATES PATENT AND TRADEMARK OFFICE
CERTIFICATE OF CORRECTION

PATENT NO. : 12,262,241 B2
APPLICATION NO. : 17/847823
DATED : March 25, 2025
INVENTOR(S) : Wei Lu et al.

It is certified that error appears in the above-identified patent and that said Letters Patent is hereby corrected as shown below:

In the Specification

Column 7, Line 57-67 replace with the following paragraph on Line 10-13:
where
    *session-AMBR* is the session-AMBR of the first session, the MBR of the $j(j = 1, 2,..., M)^{th}$ data flow in the M data flows is $MBR_j$, and an MBR of an $r(r = 1, 2,..., P)^{th}$ data flow in the P data flows is $MBR_r$.

Column 15, Line 24-27 replace with the following paragraph:

In a possible implementation method, the fourth AMBR=*session-AMBR*$*\dfrac{\sum_{r=1}^{P} MBR_r}{\sum_{j=1}^{M} MBR_j}$, where *session-AMBR* is the session-AMBR of the first session, the MBR of the $j(j=1,2,..., M)^{th}$ data flow in the M data flows is $MBR_j$, and an MBR of an $r(r = 1, 2,..., P)^{th}$ data flow in the P data flows is $MBR_r$.

Column 27, Line 2-12 replace with the following paragraph on Line 18-24:
    *session-AMBR* is the session-AMBR of the first session, an MBR of a $j(j=1, 2,..., M)^{th}$ data flow in the M data flows is $MBR_j$, an MBR of an $i(i = 1, 2,..., N)^{th}$ data flow in the N data flows is $MBR_i$, a split percentage at which the $i^{th}$ data flow passes through the data transmission channel of the first access technology is $S_i$, $\sum_{i=1}^{N} MBR_i * S_i$ is a sum of the one or more maximum bit rates of the one or more data flows that are in the data flows of the first session and that are transmitted on the data transmission channel of the first access technology, and $\sum_{j=1}^{M} MBR_j$ is a sum of the maximum bit rates of the data flows of the first session.

Signed and Sealed this
Ninth Day of December, 2025

John A. Squires
*Director of the United States Patent and Trademark Office*